(12) United States Patent
Philipson

(10) Patent No.: US 10,270,727 B2
(45) Date of Patent: Apr. 23, 2019

(54) SHORT MESSAGE COMMUNICATION WITHIN A MOBILE GRAPHICAL MAP

(71) Applicant: Palantir Technologies Inc., Palo Alto, CA (US)

(72) Inventor: David Philipson, Palo Alto, CA (US)

(73) Assignee: Palantir Technologies, Inc., Palo Alto, CA (US)

(*) Notice: Subject to any disclaimer, the term of this patent is extended or adjusted under 35 U.S.C. 154(b) by 0 days.

(21) Appl. No.: 15/792,463

(22) Filed: Oct. 24, 2017

(65) Prior Publication Data

US 2018/0176166 A1    Jun. 21, 2018

Related U.S. Application Data

(60) Provisional application No. 62/436,978, filed on Dec. 20, 2016.

(51) Int. Cl.
*H04W 4/02*    (2018.01)
*H04W 4/06*    (2009.01)
(Continued)

(52) U.S. Cl.
CPC ............ *H04L 51/20* (2013.01); *G01C 21/362* (2013.01); *G01C 21/3614* (2013.01);
(Continued)

(58) Field of Classification Search
CPC ......... H04L 51/20; H04L 51/16; H04L 51/38; G01C 21/362; G01C 21/3655;
(Continued)

(56) References Cited

U.S. PATENT DOCUMENTS

| 4,899,161 A | 2/1990 | Morin et al. |
| 4,958,305 A | 9/1990 | Piazza |

(Continued)

FOREIGN PATENT DOCUMENTS

| AU | 2012216622 | 5/2015 |
| DE | 102013222023 | 1/2015 |

(Continued)

OTHER PUBLICATIONS

Woodbridge, Stephen, "[geos-devel] Polygon simplification," <http://lists.osgeo.org/pipermail/geos-devel/2011-May/005210.html> dated May 8, 2011, pp. 3.

(Continued)

*Primary Examiner* — Babar Sarwar
(74) *Attorney, Agent, or Firm* — Hickman Palermo Becker Bingham LLP

(57) ABSTRACT

In one embodiment, a computer-implemented process is programmed or configured to allow a first mobile device to generate and send enriched pin data to a geographical messaging system. Enriched pin data may include latitude and longitude data, a timestamp, and a media element. Media elements may include image data, video data, text data, drawing data that defines a geographic location, route data that defines a geographic travel path, and/or pin expiration data. The geographical messaging system may then broadcast the enriched pin data to a second mobile device belonging to a team member in the same geographical region as the first mobile device. The second mobile device may then use the enriched pin data to display, on a geographical map, a map pin that corresponds to the enriched pin data. In one embodiment, the second mobile device may also use the enriched pin data to display, in a message chain, a message related to the enriched pin data.

20 Claims, 16 Drawing Sheets

(51) Int. Cl.
| | |
|---|---|
| *H04W 4/14* | (2009.01) |
| *H04W 4/90* | (2018.01) |
| *G01C 21/36* | (2006.01) |
| *G06T 11/20* | (2006.01) |
| *H04L 12/58* | (2006.01) |
| *H04M 1/725* | (2006.01) |
| *H04W 4/021* | (2018.01) |
| *G06F 3/0481* | (2013.01) |
| *G06F 3/0484* | (2013.01) |
| *G06F 3/0488* | (2013.01) |

(52) U.S. Cl.
CPC ....... *G01C 21/3655* (2013.01); *G06F 3/0488* (2013.01); *G06F 3/04817* (2013.01); *G06F 3/04842* (2013.01); *G06T 11/203* (2013.01); *H04L 51/16* (2013.01); *H04M 1/72552* (2013.01); *H04M 1/72572* (2013.01); *H04W 4/02* (2013.01); *H04W 4/025* (2013.01); *H04W 4/14* (2013.01); *G06F 3/04883* (2013.01); *H04L 51/38* (2013.01); *H04M 1/72536* (2013.01); *H04M 2201/42* (2013.01); *H04M 2250/60* (2013.01); *H04W 4/021* (2013.01); *H04W 4/06* (2013.01); *H04W 4/90* (2018.02)

(58) Field of Classification Search
CPC .............. G01C 21/3614; G06T 11/203; H04M 1/72572; H04M 1/72552; H04M 2201/42; H04M 1/72536; H04M 2250/60; H04W 4/025; H04W 4/14; H04W 4/021; H04W 4/06; H04W 4/02; H04W 4/90; G06F 3/04883; G06F 3/04817; G06F 3/04842; G06F 3/0488
See application file for complete search history.

(56) References Cited

U.S. PATENT DOCUMENTS

| | | | |
|---|---|---|---|
| 5,329,108 A | 7/1994 | Lamoure | |
| 5,754,182 A | 5/1998 | Kobayashi | |
| 5,781,195 A | 7/1998 | Marvin | |
| 5,781,704 A | 7/1998 | Rossmo | |
| 6,091,956 A | 7/2000 | Hollenberg | |
| 6,157,747 A | 12/2000 | Szeliski et al. | |
| 6,169,552 B1 | 1/2001 | Endo et al. | |
| 6,173,067 B1 | 1/2001 | Payton et al. | |
| 6,178,432 B1 | 1/2001 | Cook et al. | |
| 6,247,019 B1 | 6/2001 | Davies | |
| 6,389,289 B1 | 5/2002 | Voce et al. | |
| 6,414,683 B1 | 7/2002 | Gueziec | |
| 6,483,509 B1 | 11/2002 | Rabenhorst | |
| 6,529,900 B1 | 3/2003 | Patterson et al. | |
| 6,631,496 B1 | 10/2003 | Li et al. | |
| 6,662,103 B1 | 12/2003 | Skolnick et al. | |
| 6,757,445 B1 | 6/2004 | Knopp | |
| 6,828,920 B2 | 12/2004 | Owen et al. | |
| 6,983,203 B1 | 1/2006 | Wako | |
| 6,985,950 B1 | 1/2006 | Hanson et al. | |
| 7,036,085 B2 | 4/2006 | Barros | |
| 7,158,797 B1 | 1/2007 | Jayaraman | |
| 7,158,878 B2 | 1/2007 | Rasmussen et al. | |
| 7,375,732 B2 | 5/2008 | Arcas | |
| 7,379,811 B2 | 5/2008 | Rasmussen et al. | |
| 7,457,706 B2 | 11/2008 | Malero et al. | |
| 7,502,786 B2 | 3/2009 | Liu et al. | |
| 7,519,470 B2 | 4/2009 | Brasche et al. | |
| 7,529,195 B2 | 5/2009 | Gorman | |
| 7,539,666 B2 | 5/2009 | Ashworth et al. | |
| 7,558,677 B2 | 7/2009 | Jones | |
| 7,574,428 B2 | 8/2009 | Leiserowitz et al. | |
| 7,579,965 B2 | 8/2009 | Bucholz | |
| 7,617,314 B1 | 11/2009 | Bansod et al. | |
| 7,620,628 B2 | 11/2009 | Kapur et al. | |
| 7,663,621 B1 | 2/2010 | Allen et al. | |
| 7,706,817 B2 | 4/2010 | Bamrah et al. | |
| 7,725,547 B2 * | 5/2010 | Albertson | G06F 3/016 |
| | | | 382/107 |
| 7,791,616 B2 | 9/2010 | Ioup et al. | |
| 7,805,457 B1 | 9/2010 | Viola et al. | |
| 7,809,703 B2 | 10/2010 | Balabhadrapatruni et al. | |
| 7,872,647 B2 | 1/2011 | Mayer et al. | |
| 7,894,984 B2 | 2/2011 | Rasmussen et al. | |
| 7,899,611 B2 | 3/2011 | Downs et al. | |
| 7,920,963 B2 | 4/2011 | Jouline et al. | |
| 7,945,852 B1 | 5/2011 | Pilskains | |
| 7,962,281 B2 | 6/2011 | Rasmussen et al. | |
| 7,970,240 B1 | 6/2011 | Chao et al. | |
| 8,010,545 B2 | 8/2011 | Stefik et al. | |
| 8,036,632 B1 | 10/2011 | Cona et al. | |
| 8,065,080 B2 | 11/2011 | Koch | |
| 8,085,268 B2 | 12/2011 | Carrino et al. | |
| 8,134,457 B2 | 3/2012 | Velipasalar et al. | |
| 8,145,703 B2 * | 3/2012 | Frishert | G06F 17/3087 |
| | | | 707/709 |
| 8,200,676 B2 | 6/2012 | Frank | |
| 8,214,361 B1 | 7/2012 | Sandler et al. | |
| 8,214,764 B2 | 7/2012 | Gemmell et al. | |
| 8,229,947 B2 | 7/2012 | Fujinaga | |
| 8,230,333 B2 | 7/2012 | Decherd et al. | |
| 8,290,942 B2 | 10/2012 | Jones et al. | |
| 8,290,943 B2 | 10/2012 | Carbone et al. | |
| 8,301,464 B1 | 10/2012 | Cave et al. | |
| 8,325,178 B1 | 12/2012 | Doyle, Jr. | |
| 8,368,695 B2 | 2/2013 | Howell et al. | |
| 8,397,171 B2 | 3/2013 | Klassen et al. | |
| 8,400,448 B1 | 3/2013 | Doyle, Jr. | |
| 8,407,180 B1 | 3/2013 | Ramesh et al. | |
| 8,412,234 B1 | 4/2013 | Gatmir-Motahari et al. | |
| 8,412,707 B1 | 4/2013 | Mianji | |
| 8,417,000 B1 * | 4/2013 | Mendis | G06K 9/00671 |
| | | | 382/118 |
| 8,422,825 B1 | 4/2013 | Neophytou et al. | |
| 8,423,290 B1 * | 4/2013 | Walsh | G01C 21/34 |
| | | | 340/995.19 |
| 8,452,790 B1 | 5/2013 | Mianji | |
| 8,463,036 B1 | 6/2013 | Ramesh et al. | |
| 8,489,331 B2 | 7/2013 | Kopf et al. | |
| 8,489,641 B1 * | 7/2013 | Seefeld | G06F 17/30241 |
| | | | 707/792 |
| 8,498,984 B1 | 7/2013 | Hwang et al. | |
| 8,508,533 B2 | 8/2013 | Cervelli et al. | |
| 8,514,229 B2 | 8/2013 | Cervelli et al. | |
| 8,515,207 B2 | 8/2013 | Chau | |
| 8,538,374 B1 * | 9/2013 | Haimo | G01S 19/17 |
| | | | 455/404.2 |
| 8,564,596 B2 | 10/2013 | Carrino et al. | |
| 8,688,069 B1 | 4/2014 | Cazanas | |
| 8,742,934 B1 | 6/2014 | Sarpy et al. | |
| 8,745,516 B2 * | 6/2014 | Mason | G06F 3/04817 |
| | | | 715/767 |
| 8,781,169 B2 | 7/2014 | Jackson et al. | |
| 8,799,799 B1 | 8/2014 | Cervelli et al. | |
| 8,830,322 B2 | 9/2014 | Nerayoff et al. | |
| 8,938,686 B1 | 1/2015 | Erenrich et al. | |
| 8,949,164 B1 | 2/2015 | Mohler | |
| 8,983,494 B1 | 3/2015 | Onnen et al. | |
| 9,009,177 B2 | 4/2015 | Zheng et al. | |
| 9,021,384 B1 * | 4/2015 | Beard | G06F 3/0481 |
| | | | 382/105 |
| 9,104,293 B1 | 8/2015 | Kornfeld et al. | |
| 9,104,695 B1 | 8/2015 | Cervelli et al. | |
| 9,111,380 B2 | 8/2015 | Piemonte et al. | |
| 9,129,219 B1 | 9/2015 | Robertson et al. | |
| 9,146,125 B2 | 9/2015 | Vulcano et al. | |
| 9,280,618 B1 | 3/2016 | Bruce et al. | |
| 9,459,756 B2 * | 10/2016 | Choi | H04W 4/02 |
| 9,852,195 B2 * | 12/2017 | Ma | G06T 11/206 |
| 9,891,808 B2 * | 2/2018 | Wilson | G06F 17/30241 |
| 9,953,445 B2 * | 4/2018 | Cervelli | G06F 3/0481 |
| 2002/0003539 A1 | 1/2002 | Abe | |

(56) References Cited

U.S. PATENT DOCUMENTS

| | | |
|---|---|---|
| 2002/0033848 A1 | 3/2002 | Sciammarella et al. |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2003/0052896 A1 | 3/2003 | Higgins et al. |
| 2003/0061211 A1 | 3/2003 | Shultz |
| 2003/0103049 A1 | 6/2003 | Kindratenko et al. |
| 2003/0144868 A1 | 7/2003 | MacIntyre et al. |
| 2003/0163352 A1 | 8/2003 | Surpin et al. |
| 2003/0163795 A1* | 8/2003 | Morgan .............. G06F 17/5068 716/114 |
| 2003/0225755 A1 | 12/2003 | Iwayama et al. |
| 2004/0030492 A1 | 2/2004 | Fox et al. |
| 2004/0039498 A1 | 2/2004 | Ollis et al. |
| 2004/0098236 A1 | 5/2004 | Mayer et al. |
| 2005/0031197 A1 | 2/2005 | Knopp |
| 2005/0034062 A1 | 2/2005 | Bufkin et al. |
| 2005/0080769 A1 | 4/2005 | Gemmell |
| 2005/0143096 A1 | 6/2005 | Boesch |
| 2005/0143602 A1 | 6/2005 | Yada et al. |
| 2005/0162523 A1 | 7/2005 | Darrell et al. |
| 2005/0182502 A1 | 8/2005 | Iyengar |
| 2005/0182793 A1 | 8/2005 | Keenan et al. |
| 2005/0210409 A1 | 9/2005 | Jou |
| 2005/0223044 A1 | 10/2005 | Ashworth et al. |
| 2005/0267652 A1 | 12/2005 | Allstadt et al. |
| 2006/0026170 A1 | 2/2006 | Kreitler et al. |
| 2006/0139375 A1 | 6/2006 | Rasmussen et al. |
| 2006/0146050 A1 | 7/2006 | Yamauchi |
| 2006/0149596 A1 | 7/2006 | Surpin et al. |
| 2006/0200384 A1 | 9/2006 | Arutunian et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0072591 A1 | 3/2007 | McGary |
| 2007/0078832 A1 | 4/2007 | Ott et al. |
| 2007/0115373 A1 | 5/2007 | Gallagher et al. |
| 2007/0188516 A1 | 8/2007 | Loup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0294643 A1 | 12/2007 | Kyle |
| 2007/0296575 A1* | 12/2007 | Eisold ................. G08B 27/006 340/539.16 |
| 2008/0010605 A1 | 1/2008 | Frank |
| 2008/0040684 A1 | 2/2008 | Crump |
| 2008/0070546 A1* | 3/2008 | Lee ....................... H04W 4/90 455/404.2 |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0223834 A1 | 9/2008 | Griffiths et al. |
| 2008/0227473 A1 | 9/2008 | Haney |
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shmiasaki et al. |
| 2009/0132921 A1 | 5/2009 | Hwangbo et al. |
| 2009/0132953 A1 | 5/2009 | Reed et al. |
| 2009/0143052 A1 | 6/2009 | Bates |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford |
| 2010/0057716 A1 | 3/2010 | Stefik et al. |
| 2010/0058212 A1 | 3/2010 | Belitz |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0145947 A1* | 6/2010 | Kolman ............. G06F 17/3087 707/736 |
| 2010/0162176 A1 | 6/2010 | Dunton |
| 2010/0185692 A1 | 7/2010 | Zhang et al. |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett et al. |
| 2010/0321399 A1 | 12/2010 | Ellren et al. |
| 2011/0022312 A1 | 1/2011 | McDonough et al. |
| 2011/0046920 A1* | 2/2011 | Amis ..................... G01S 19/16 702/181 |
| 2011/0090254 A1 | 4/2011 | Carrino et al. |
| 2011/0111786 A1* | 5/2011 | Rao ..................... G06Q 10/10 455/517 |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270705 A1* | 11/2011 | Parker .............. G06F 17/30241 705/26.61 |
| 2012/0008526 A1* | 1/2012 | Borghei ............... H04W 4/021 370/254 |
| 2012/0015673 A1 | 1/2012 | Klassen |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo et al. |
| 2012/0159363 A1 | 6/2012 | DeBacker et al. |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221239 A1 | 8/2012 | Cooper et al. |
| 2012/0221580 A1 | 8/2012 | Barney |
| 2011/0323888 | 12/2012 | Osann, Jr. |
| 2012/0323888 | 12/2012 | Osann, Jr. |
| 2013/0005362 A1 | 1/2013 | Borghei |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0117830 A1* | 5/2013 | Erickson ............. H04L 63/0428 726/6 |
| 2013/0132398 A1 | 5/2013 | Pfiefle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |

(56) References Cited

U.S. PATENT DOCUMENTS

| | | | |
|---|---|---|---|
| 2013/0325340 A1* | 12/2013 | Forstall | G01C 21/00 |
| | | | 701/533 |
| 2013/0326366 A1* | 12/2013 | Choi | H04W 4/02 |
| | | | 715/752 |
| 2013/0339891 A1 | 12/2013 | Blumenberg et al. | |
| 2013/0345980 A1* | 12/2013 | van Os | G01C 21/3626 |
| | | | 701/538 |
| 2014/0176606 A1 | 6/2014 | Narayan et al. | |
| 2014/0218400 A1 | 8/2014 | O'Toole et al. | |
| 2014/0221016 A1* | 8/2014 | Lee | G08B 21/0269 |
| | | | 455/456.3 |
| 2014/0333651 A1 | 11/2014 | Cervelli et al. | |
| 2014/0337772 A1 | 11/2014 | Cervelli et al. | |
| 2014/0361899 A1 | 12/2014 | Layson | |
| 2015/0005014 A1 | 1/2015 | Huang | |
| 2015/0029176 A1 | 1/2015 | Baxter et al. | |
| 2015/0100907 A1 | 4/2015 | Erenrich et al. | |
| 2015/0106170 A1 | 4/2015 | Bonica | |
| 2015/0163626 A1 | 6/2015 | Zimmer | |
| 2015/0186821 A1 | 7/2015 | Wang et al. | |
| 2015/0187036 A1 | 7/2015 | Wang et al. | |
| 2015/0187100 A1 | 7/2015 | Berry et al. | |
| 2015/0312323 A1 | 10/2015 | Peterson | |
| 2015/0319297 A1* | 11/2015 | Beyer, Jr. | H04W 4/90 |
| | | | 455/456.6 |
| 2015/0338233 A1 | 11/2015 | Cervelli et al. | |
| 2015/0379413 A1 | 12/2015 | Robertson et al. | |
| 2016/0249170 A1* | 8/2016 | Freeland | G06T 1/00 |
| 2016/0344801 A1 | 11/2016 | Akkarawittayapoom | |

FOREIGN PATENT DOCUMENTS

| | | |
|---|---|---|
| EP | 0 763 201 | 3/1997 |
| EP | 2 575 107 | 4/2013 |
| EP | 2858014 | 4/2015 |
| EP | 2963595 | 1/2016 |
| GB | 2516155 | 1/2015 |
| NL | 2012778 | 11/2014 |
| NZ | 624557 | 12/2014 |
| WO | WO 95/032424 | 11/1995 |
| WO | WO 2000/009529 | 2/2000 |
| WO | WO 2001/098925 | 12/2001 |
| WO | WO 2004/057268 | 7/2004 |
| WO | WO 2005/013200 | 2/2005 |
| WO | WO 2008/064207 | 5/2008 |
| WO | WO 2009/061501 | 5/2009 |
| WO | WO 2009/123975 | 10/2009 |
| WO | WO 2011/058507 | 5/2011 |

OTHER PUBLICATIONS

Huff et al., "Calibrating the Huff Model Using ArcGIS Business Analyst," ESRI, Sep. 2008, pp. 33.

Barnes et al., "Viewshed Analysis", GIS-ARC/INFO 2001, <www.evsc.virginia.edu/~jhp7e/evsc466/student_pres/Rounds.pdf>.

Huff, David L., "Parameter Estimation in the Huff Model," ESRI, ArcUser, Oct.-Dec. 2003, pp. 34-36.

Wikipedia, "Douglas_Peucker-Algorithms," <http://de.wikipedia.org/w/index.php?title=Douglas-Peucker-Algorithmus&oldid=91846042> printed Jul. 2011, pp. 2.

Map of San Jose, CA. Retrieved Oct. 2, 2013 from http://maps.google.com.

Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.

Ipbucker, C., "Inverse Transformation for Several Pseudo-cylindrical Map Projections Using Jacobian Matrix," ICCSA 2009, Part 1 LNCS 5592, pp. 553-564.

Wongsuphasawat et al., "Visual Analytics for Transportation Incident Data Sets," Transportation Research Record 2138, 2009, pp. 135-145.

Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.

Reibel, M., "Geographic Information Systems and Spatial Data Processing in Demography: a Review," Population Research and Policy Review, 2007, vol. 26, pp. 601-618.

Mandagere, Nagapramod, "Buffer Operations in GIS," <http://www-users.cs.umn.edu/~npramod/enc_pdf.pdf> retrieved Jan. 28, 2010, pp. 7.

Map of San Jose, CA. Retrieved Oct. 2, 2013 from http://maps.yahoo.com.

Open Street Map, "Amm's Diary:Unconnected ways and other data quality issues," http://www.openstreetmap.org/user/amm/diary printed Jul. 23, 2012 in 3 pages.

SONRIS, "Using the area of Interest Tools," <http://web.archive.org/web/20061001053327/http://sonris-www.dnr.state.la.us/gis/instruct_files/tutslide12> printed Jan. 3, 2013 in 1 page.

"A First Look: Predicting Market Demand for Food Retail using a Huff Analysis," TRF Policy Solutions, Jul. 2012, pp. 30.

GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.

Wikipedia, "Ramer_Douglas_peucker Algorithm," <http://en.wikipedia.org/wiki/Ramer%E2%80%93Douglas%E2%80%93Peucker_algorithm> printed Jul. 2011, pp. 3.

Definition "Identify", downloaded Jan. 22, 2015, 1 page.

Chen et al., "Brining Order to the Web: Automatically Categorizing Search Results," CHI 2000, Proceedings of the SIGCHI confernece on Human Factors in Computing Systems, Apr. 1-6, 2000, The Hague, The Neatherlands, pp. 145-152.

Snyder, "Map Projections—A Working Manual," U.S. Geological Survey Professional paper 1395, United States Government Printing Office, Washington: 1987, pp. 11-21 and 60-70.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Pozzi et al., "Vegetation and Population Density in Urban and Suburban Areas in the U.S.A." Third International Symposium of Remote Sensing of Urban Areas Istanbul, Turkey, Jun. 2002, pp. 8.

Carver et al., "Real-Time Visibility Analysis and Rapid Viewshed Calculation Using a Voxel-Based Modelling Approach," GISRUK 2012 Conference, Apr. 11th-13th, Lancaster UK, Apr. 13, 2012, pp. 6.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

Ghosh, P., "A Solution of Polygon Containment, Spatial Planning, and Other Related Problems Using Minkowski Operations," Computer Vision, Graphics, and Image Processing, 1990, vol. 49, pp. 1-35.

Levine, N., "Crime Mapping and the Crimestat Program," Geographical Analysis, 2006, vol. 38, pp. 41-56.

Thompson, Mick, "Getting Started with GEO," Getting Started with GEO, Jul. 26, 2011.

Hibbert et al., "Prediction of Shopping Behavior Using a Huff Model Within a GIS Framework," Healthy Eating in Context, Mar. 18, 2011, pp. 16.

Map of San Jose, CA. Retrieved Oct. 2, 2013 from http://maps.bing.com.

Griffith, Daniel A., "A Generalized Huff Model," Geographical Analysis, Apr. 1982, vol. 14, No. 2, pp. 135-144.

Valentini et al., "Ensembles of Learning Machines", M. Marinaro and R. Tagliaferri (Eds.): WIRN VIETRI 2002, LNCS 2486, pp. 3-20.

VB Forums, "Buffer a Polygon," Internet Citation, <http://www.vbforums.com/showthread.php?198436-Buffer-a-Polygon>, Specifically Thread #1, #5 & #11 retrieved on May 2, 2013, pp. 8.

Huang et al., "Systematic and Integrative Analysis of Large Gene Lists Using DAVID Bioinformatics Resources," Nature Protocols, 4.1, 2008, 44-57.

(56) References Cited

OTHER PUBLICATIONS

Definition "Overlay", downloaded Jan. 22, 2015, 1 page.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.
"Andy Turner's GISRUK 2012 Notes" <https://docs.google.com/document/d/1cTmxg7mVx5gd89lqblCYvCEnHA4QAivH414WpyPsqE4/edit?pli=1> printed Sep. 16, 2013 in 15 pages.
POI Editor, "How to: Create Your Own Points of Interest," <http://www.poieditor.com/articles/how_to_create_your_own_points_of_interest/> printed Jul. 22, 2012 in 4 pages.
Vivid Solutions, "JTS Topology Suite: Technical Specifications," <http://www.vividsolutions.com/jts/bin/JTS%20Technical%20Specs.pdf> Version 1.4, 2003, pp. 36.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Haralick et al., "Image Analysis Using Mathematical Morphology," Pattern Analysis and Machine Intelligence, IEEE Transactions, Jul. 1987, vol. PAMI-9, No. 4, pp. 532-550.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Gorr et al., "Crime Hot Spot Forecasting: Modeling and Comparative Evaluation", Grant 98-IJ-CX-K005, May 6, 2002, 37 pages.
Tangelder et al., "Freeform Shape Matching Using Minkowski Operations," The Netherlands, Jun. 1996, pp. 12.
Reibel et al., "Areal Interpolation of Population Counts Using Pre-classi_ed Land Cover Data," Population Research and Policy Review, 2007, vol. 26, pp. 619-633.
U.S. Appl. No. 15/145,177, filed May 3, 2016, Final Office Action, dated Dec. 2, 2016.
U.S. Appl. No. 13/839,026, filed Mar. 15, 2013, Notice of Allowance, dated Mar. 11, 2016.
U.S. Appl. No. 13/839,026, filed Mar. 15, 2013, Office Action, dated Aug. 4, 2015.
U.S. Appl. No. 13/839,026, filed Mar. 15, 2013, Restriction Requirement, dated Apr. 2, 2015.
U.S. Appl. No. 15/145,177, filed May 3, 2016, Office Action, dated Jul. 29, 2016.
Official Communication for European Patent Application No. 17207998.0 dated Mar. 12, 2018, 12 pages.

* cited by examiner

SHORT MESSAGE COMMUNICATION WITHIN A MOBILE GRAPHICAL MAP

CROSS-REFERENCE TO RELATED APPLICATIONS; BENEFIT CLAIM

This application claims the benefit of U.S. Provisional Patent Application No. 62/436,978, filed Dec. 20, 2016, the entire contents of which is hereby incorporated by reference as if fully set forth herein, under 35 U.S.C. § 119(e). This application is related to U.S. patent application Ser. No. 13/839,026, entitled "Use of Teams in a Mobile Application", filed on Mar. 15, 2013, now issued U.S. Pat. No. 9,380,431 B1, the entire contents of which are hereby incorporated by reference as if fully set forth herein. This application is related to U.S. patent application Ser. No. 15/145,177, entitled "Use of Teams in a Mobile Application", filed on May 3, 2016, the entire contents of which are hereby incorporated by reference as if fully set forth herein. SUGGESTED GROUP ART UNIT: 2643.

TECHNICAL FIELD

The present disclosure relates to a geographical messaging system. More specifically, the disclosure relates to short message communication within a mobile graphical map using a geographical messaging system.

BACKGROUND

Field operatives and team members in a local geographic area often need to communicate information to one another. For example, emergency responders, search and rescue teams, law enforcement officers, news reporters, and other types of field operatives need to coordinate information regarding positioning, routes of travel, and geographic features in real time to their teams. Such communication typically occurs by verbal communication via telephone or radio. As a result, such communication is imprecise, suffers from delays based on verbal communication protocol, and does not allow for ease of broadcasting information to an entire team in a local geographic area. Moreover, existing verbal communication techniques do not allow field operatives to provide media or other enriched data with their communication that is location-specific.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

Figure 1:
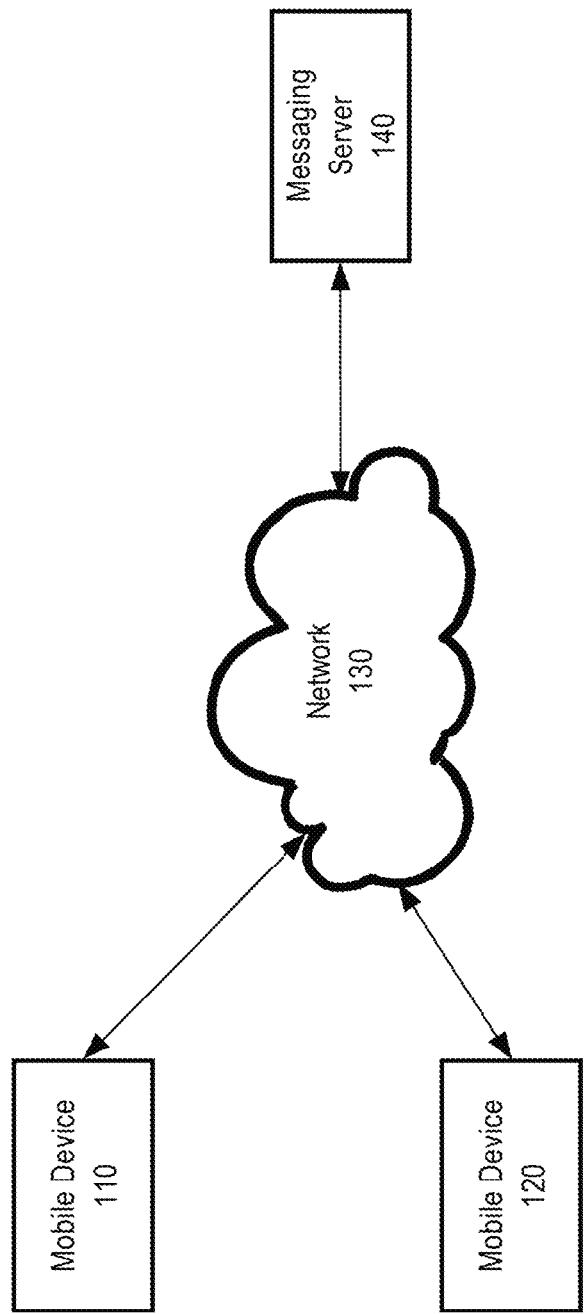
FIG. 1 is a block diagram of a geographical messaging system, according to one embodiment.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
    2.0 EXAMPLE COMPUTER SYSTEM IMPLEMENTATION
      2.1 ENRICHED PIN DATA
      2.2 POSITIONAL MAP PIN
      2.3 OFF-SCREEN MAP PIN
      2.4 GENERAING A MAP PIN BASED ON USER INPUT
      2.5 PING MAP PIN
      2.6 ASSISTANCE MAP PIN
      2.7 TRAVEL ROUTE MAP PIN
      2.8 DRAWING MAP PIN
      2.9 MESSAGE CHAIN HISTORY
      2.10 ADDITIONAL FEATURES
      2.11 APPLICATION AREAS
    3.0 EXAMPLE PROCESS AND ALGORITHM
    4.0 IMPLEMENTATION MECHANISMS—HARDWARE OVERVIEW
    5.0 IMPLEMENTATION MECHANISMS—SOFTWARE OVERVIEW
    6.0 OTHER ASPECTS OF DISCLOSURE

1.0 GENERAL OVERVIEW

A geographical position of a mobile computing device in a digital map, based upon receiving location signals from the device, may be graphically illustrated using a virtual map pin. The virtual map pin may be associated with stored digital data such as a latitude value and a longitude value, and sometimes a time value. Collectively, this data may be termed digital map pin data and can be used to calculate routes, store locations that devices visited for historical purposes or auditing, and other applications.

In one embodiment, a computer-implemented process is programmed or configured to allow a first mobile device to generate and send digital enriched pin data to a geographical messaging system. The first mobile device may generate the enriched pin data based on user input and/or data automatically retrieved from the first mobile device, such as the geographical location of the first mobile device or a unique identifier that identifies the owner of the first mobile device.

Digital enriched pin data may comprise latitude and longitude data, a timestamp, and a media element. Media elements may include image data, video data, audio data, text data, drawing data that defines a geographic location, route data that defines a geographic travel path, and/or pin expiration data. The geographical messaging system may then broadcast the enriched pin data to a second mobile device belonging to a team member in the same geographical region as the first mobile device. In one embodiment, the geographical messaging system may broadcast the enriched pin data to a second mobile device via a messaging server, however, in another embodiment, the geographical messaging system may broadcast the enriched pin data to a second mobile device directly from the first mobile device without the use of a messaging server.

The second mobile device may then use the enriched pin data to display, on a graphical map, a map pin that corresponds to the enriched pin data. The map pin may be positioned on the graphical map based on the enriched pin data's latitude and longitude data. The map pin may display the timestamp and/or the media element either immediately or based on user interaction with the map pin.

In one embodiment, the second mobile device may also use the enriched pin data to display, in a message chain history, a message related to the enriched pin data.

2.0 EXAMPLE COMPUTER SYSTEM IMPLEMENTATION

FIG. 1 illustrates an example geographical messaging system 100 in which the techniques described herein may be practiced, according to some embodiments. In the example of FIG. 1, geographical messaging system 100 is programmed or configured to generate, transmit, and display digital enriched pin data. Geographical messaging system 100 may be implemented across one or more physical or virtual computing devices, none of which is intended as a generic computer, since it is loaded with instructions in a new ordered combination as otherwise disclosed herein to implement the functions and algorithms of this disclosure. The example components of geographical messaging system 100 shown in FIG. 1 are implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. The functions described herein are intended to indicate operations that are performed using programming in a special-purpose computer or general-purpose computer, in various embodiments. Geographical messaging system 100 illustrates only one of many possible arrangements of components configured to execute the programming described herein. Other arrangements may include fewer or different components, and the division of work between the components may vary depending on the arrangement.

Geographical messaging system 100 comprises one or more mobile devices 110, 120. For purposes of illustrating a clear example, two (2) instances of mobile devices are shown in FIG. 1, however, the techniques of the present disclosure may use any number of mobile devices in other embodiments. Each mobile device 110, 120 may be any computing device with mobile capability, including, but not limited to a smartphone, tablet computer, laptop computer, unmanned aerial vehicle, automobile dashboard computing device, or any similar computing device.

Mobile devices 110, 120 are each communicatively coupled to network 130. Network 130 may be any communication network, such as communication over the Internet or a private network. In an embodiment, network 130 may include a wireless network via one or more wireless transmission protocols, such as 802.11 a/b/g/n, Bluetooth, LTE, 3G, CDMA, or any other wireless protocol.

Mobile devices 110, 120 are each programmed or configured to display graphical maps. A graphical map is a graphical visualization of a geographic area and its features. Graphical maps be implemented via a downloadable application, a web-based application, or some other similar implementation. For example, a graphical map may be used to display roads, walking paths, buildings, topography, traffic, transit networks, weather conditions, or other geographic-based features of an area. In one embodiment, a graphical map may be displayed in a three-dimensional space, such as an augmented reality (AR) or virtual reality (VR) visualization.

Mobile devices 110 and/or 120 are further programmed or configured to receive user input, for example, via a keyboard, touch screen, stylus, button(s), scroll wheel, or any other user input device. In an embodiment, mobile devices 110 and/or 120 may comprise a Global Positioning System (GPS) system that is programmed or configured to receive GPS data regarding the position of the mobile device, including latitude and/or longitude data. Mobile devices 110, 120 may comprise an altimeter system that is programmed or configured to determine the altitude of the mobile device. Mobile devices 110 and/or 120 may comprise an accelerometer that is programmed or configured to determine the acceleration of the mobile device. Mobile devices 110 and/or 120 may comprise a gyroscope that is programmed or configured to determine the orientation of the mobile device.

In some embodiments, geographical messaging system 100 may further comprise messaging server 140 that is also communicatively coupled to network 130. In one embodiment, mobile devices 110, 120 may communicate with one another using a messaging server 140, via network 130. In another embodiment, mobile devices 110, 120 may communicate directly with one another via network 130, without a messaging server 140.

In one embodiment, a mobile device 110 may be programmed or configured to receive user input, via a first graphical map that identifies a location point in the first graphical map at a particular latitude value and longitude value. The mobile device 110 may be programmed or configured to use the user input to generate digital enriched pin data for the location point. Further details regarding the contents of the enriched pin data will be discussed herein. The mobile device 110 may be programmed or configured to send the enriched pin data to mobile device 120. In one embodiment, sending the enriched pin data from mobile device 110 to mobile device 120 may involve the messaging server 140, however, in another embodiment, mobile device 110 may send the enriched pin data directly to mobile device 120 without the messaging server 140. Mobile device 120 may then, upon receiving the enriched pin data, use the enriched pin data to display a pin on a second graphical map, wherein the pin is positioned at the location point. In one embodiment, enriched pin data may comprise one or more media elements, such as images, videos, text, route data, or drawing data. The one or more media elements may be displayed with the pin on the second graphical map.

For example, one embodiment provides a computer-implemented method or system for receiving user input that selects a point in a first graphical map at a first mobile device. The method or system further comprises, in response to receiving the user input, generating, based on the user input, enriched pin data comprising a latitude value representing a latitude position of the point, a longitude value representing a longitude position of the point, a timestamp value, and a media element. The method or system further comprises sending the enriched pin data to a second mobile device and, in response to receiving the enriched pin data at the second mobile device, displaying a pin on a second graphical map on the second mobile device, wherein the pin is positioned on the second graphical map using the latitude value and longitude value, wherein the pin comprises an indicator of the timestamp value, and wherein the pin is configured to display the media element.

The present techniques thus allow members of a team to communicate information to one another in the field, using geographic-based short messages. The enriched pin data allows for team members, using mobile devices, to convey meaningful information that is geography-specific for display in a graphical map on a mobile device. These techniques are particularly useful in application areas where geographic-based messages provide meaningful information to users, such as emergency responders, search and rescue teams, fire departments, law enforcement, new reporting, or other similar application areas.

2.1 Enriched Pin Data

Enriched pin data may be defined as digital data that may be graphically depicted as a pin at a location point in a graphical map on a mobile device. In an embodiment, enriched pin data comprises a latitude value that represents a latitude position of the location point and a longitude value that represents a longitude position of the location point. Enriched pin data further comprises a creation timestamp value that represents the time at which the enriched pin data was generated. Enriched pin data may further comprise one or more pin types that indicate what kind of pin should be displayed in a graphical map using the enriched pin data.

In an embodiment, enriched pin data may comprise one or more media element(s). A media element may be any supplementary data that can be displayed with a pin. For example, a media element may include image data, video data, text data, drawing data that defines a geographical location, route data that defines a geographic travel path, and/or pin expiration data that indicates an expiration timestamp value or an expiration time period for when the enriched pin data expires. In an embodiment, media element(s) may be generated by a mobile device 110 based on user input. For example, image data or video data may be generated based on an image capture device associated with mobile device 110. Likewise, text data may be provided by user input at mobile device 110.

In an embodiment, enriched pin data may be generated at a mobile device 110. For example, enriched pin data may be generated at mobile device 110 in response to receiving user input on mobile device 110.

In another embodiment, such as in the case of a positional map pin, enriched pin data may be generated automatically by a mobile device 110 based on the position of the mobile device, as determined from one or more of a GPS system, altimeter system, accelerometer, and/or gyroscope of the mobile device 110.

In an embodiment, enriched pin data may include sender identifier data that identifies the sender of the enriched pin data. For example, sender identifier data may identify the mobile device 110 and/or the user associated with the mobile device 110. For example, the enriched pin data may include the name of the user that owns mobile device 110 or the initials of the user that own the mobile device 110 or some other information that identifies the sender.

Enriched pin data may be transmitted from a mobile device 110 to a mobile device 120. Such a transmission may be performed using messaging server 140 or, alternatively, may be performed directly between mobile device 110 and mobile device 120. Mobile device 120 may then use the enriched pin data to graphically display a pin on a graphical map of mobile device 120 based upon the enriched pin data.

2.2 Positional Map Pin

A positional map pin is a type of map pin that can be used to display enriched pin data that represents the position of a mobile device.

In an embodiment, a positional pin may be automatically generated by a mobile device 110 based on the location of the mobile device as represented by enriched pin data. For example, mobile device 110 may automatically, without user interaction, use positional data, including latitude value and longitude value of the mobile device 110, to generate enriched pin data, and transmit that enriched pin data to another mobile device 120 for display as a map pin. The second mobile device 120 can thus display a map pin that represents the relative position of the mobile device 110 on a graphical map.

Figure 2A:
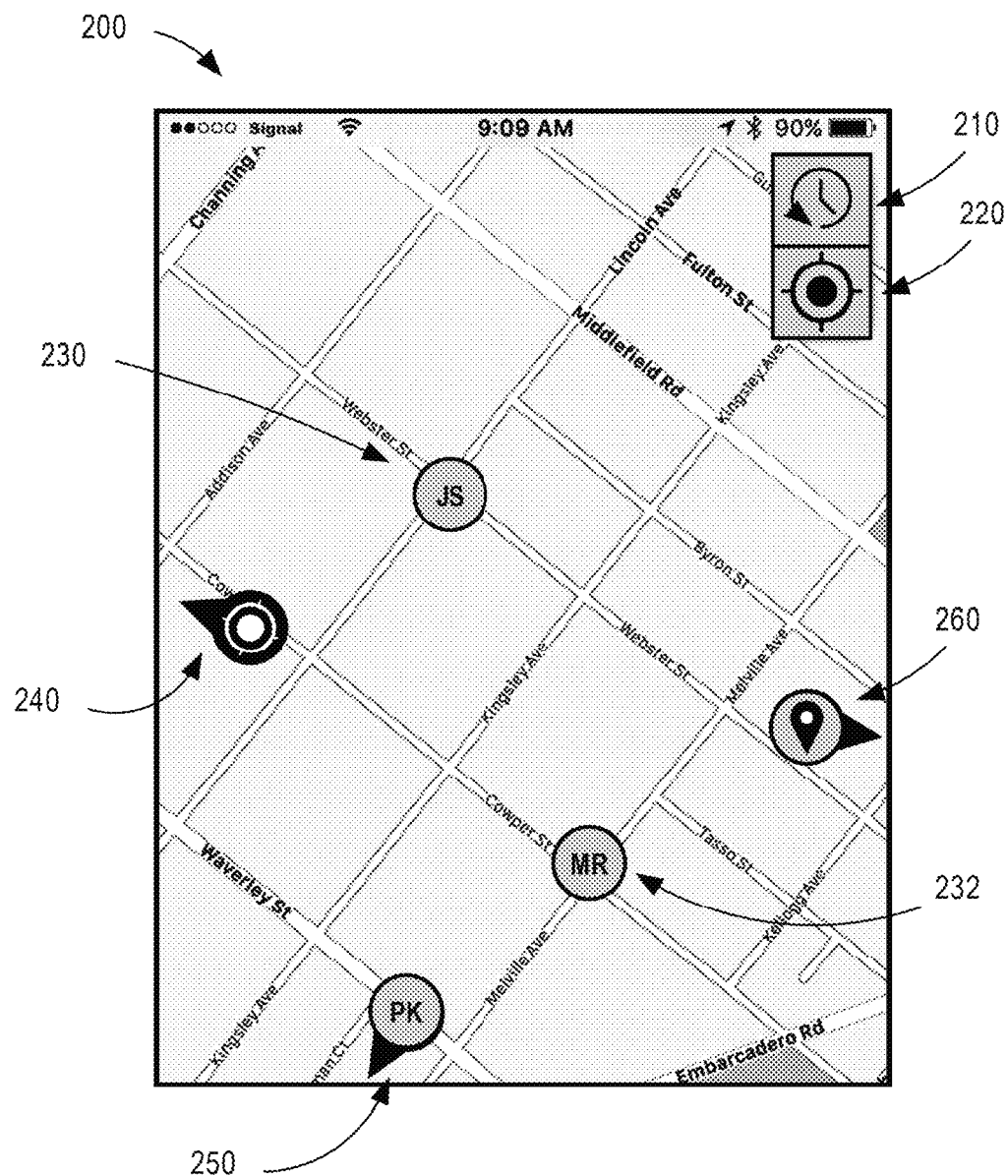
FIG. 2A and FIG. 2B illustrate example graphical maps for generating, interacting with, and displaying positional map pins, according to one embodiment.

FIG. 2A illustrates an example graphical map 200 of a mobile device that displays positional map pins. Graphical map 200 is a graphical visualization of a geographic area. Graphical map 200 includes positional map pins 230, 232, 240, and 250 that each graphically depicts a set of enriched pin data. Each of the positional map pins 230, 232, 240, and 250 represents the position of a particular mobile device, such as a mobile device of a team member for a team of field operatives. In an embodiment, a positional map pin may further display data regarding a unique identifier of the sender of the mobile device that the positional map pin represents, such as the name of the mobile device's user or their initials. For example, positional map pin 230 represents the position of a mobile device "JS" which may represent "Jane Smith". Positional map pin 232 represents the position of a mobile device "MR" which may represent "Mary Richardson", and positional map pin 250 represents the position of a mobile device "PK" which may represent "Paul Kennedy". Positional map pin 240, as denoted by a unique symbol, represents the position of the mobile device of the current user's mobile device. Thus, positional map pin 240 allows the current user to identify their relative location to the graphical map 200.

In an embodiment, a graphical map may include a user input for centering the graphical map on the position of the current user's mobile device. For example, graphical map 200 includes a button 220 that can be depressed to center the graphical map 200 on the position associated with positional map pin 240, which represents the position of the current user's mobile device.

In an embodiment, a graphical map 200 may include a user input for displaying a message chain history. For example, graphical map 200 includes a button 210 that can be depressed to display a message chain history of nearby map pins for a team. Further details regarding the message chain history will be described herein.

In an embodiment, positional map pins are automatically updated in real-time as nearby team members move with their mobile devices, thereby ensuring that a graphical map 200 has a current depiction of the relative positions of team members.

Figure 2B:
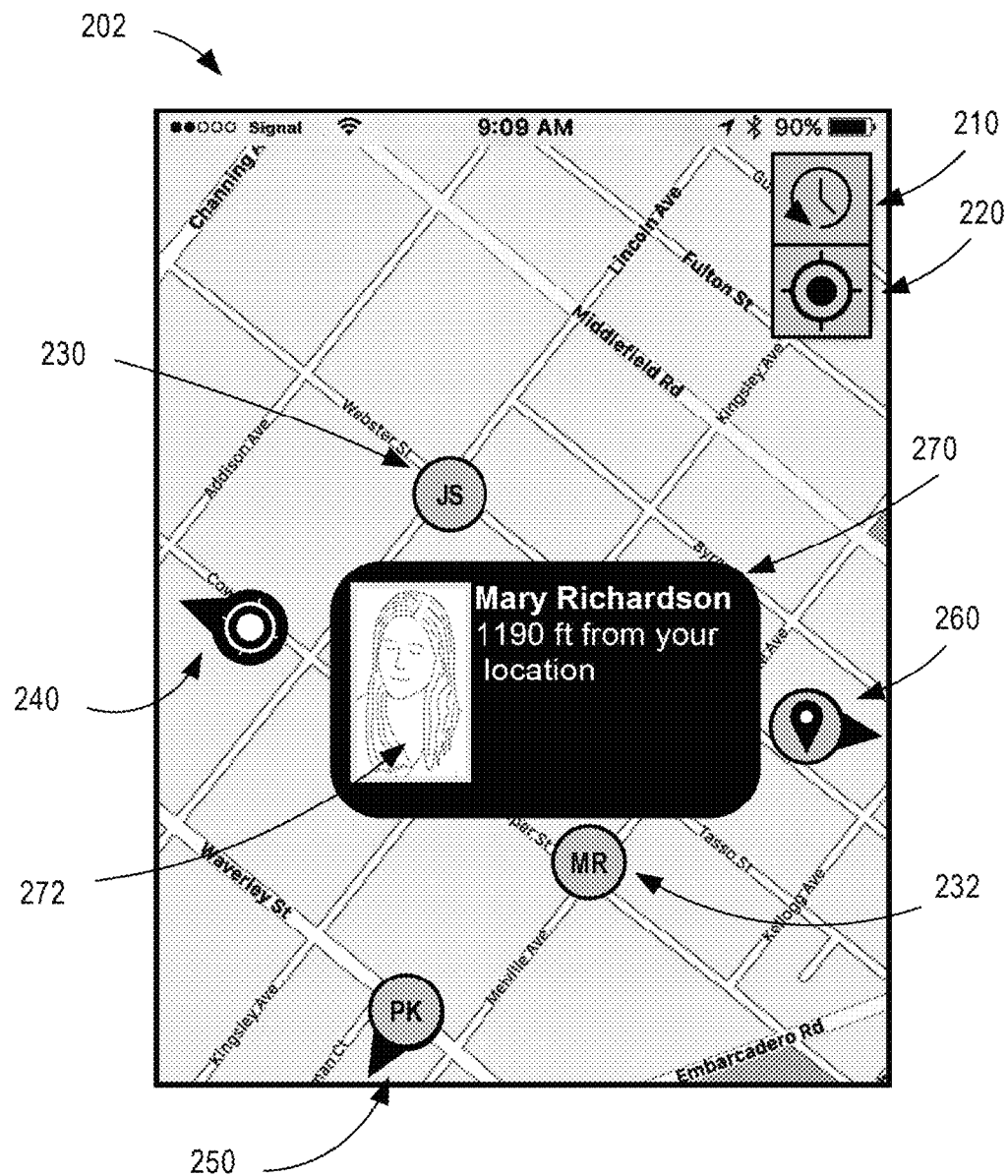

FIG. 2B illustrates an example graphical map 202 of a mobile device after a user has interacted with positional map pin 232. Upon interacting with positional map pin 232, such as via a touch gesture, graphical map 202 displays a map pin popup 270. A map pin popup is a graphical display of additional information from the enriched pin data associated with a map pin. A map pin popup can be used to display any data associated with enriched pin data, such as a media element. Map pin popup 270 includes a description of the sender of the positional map pin 232 to be "Mary Richardson". Map pin popup 270 includes a calculation of the relative distance of the positional map pin 232 from the current position of the current user's mobile device located at positional map pin 240 as "1190 ft from your location". Map pin popup 270 further includes an image 272, which is an example of a media element associated with the enriched pin data for the positional map pin 232. In this example, the image 272 is a picture of Mary Richardson. By interacting with a map pin, a user can thus observe and see additional information associated with a map pin via a map pin popup.

2.3 Off-Screen Map Pin

An off-screen map pin is an alternative visualization of a map pin that indicates that the location associated with the map pin is off-screen from the currently-displayed area of the graphical map with a graphical indicator. For example, returning to FIG. 2A, the positional map pins 240 and 250 and ping map pin 260 include directional indicators, such as an arrow and are positioned at the edge of the graphical map 200 to indicate that the respective positions of the map pins are off-screen. Thus, a user looking at graphical map 200 would know that positional map pin 240 is to the left of the currently-displayed area of the graphical map 200, positional map pin 250 is below the currently-displayed area of the graphical map 200, and ping map pin 260 is to the right of the currently-displayed area of the graphical map 200.

In one embodiment, off-screen map pins are only displayed for map pins that are unread by the current mobile device. Thus, if a mobile device marks a particular map pin as read, such as by interacting with the map pin, it will no longer generate an off-screen map pin if that particular map pin's position is off-screen. This can help to reduce clutter visualization in a graphical map by removing map pins that have already been read.

2.4 Generating a Map Pin Based on User Input

Figure 3:
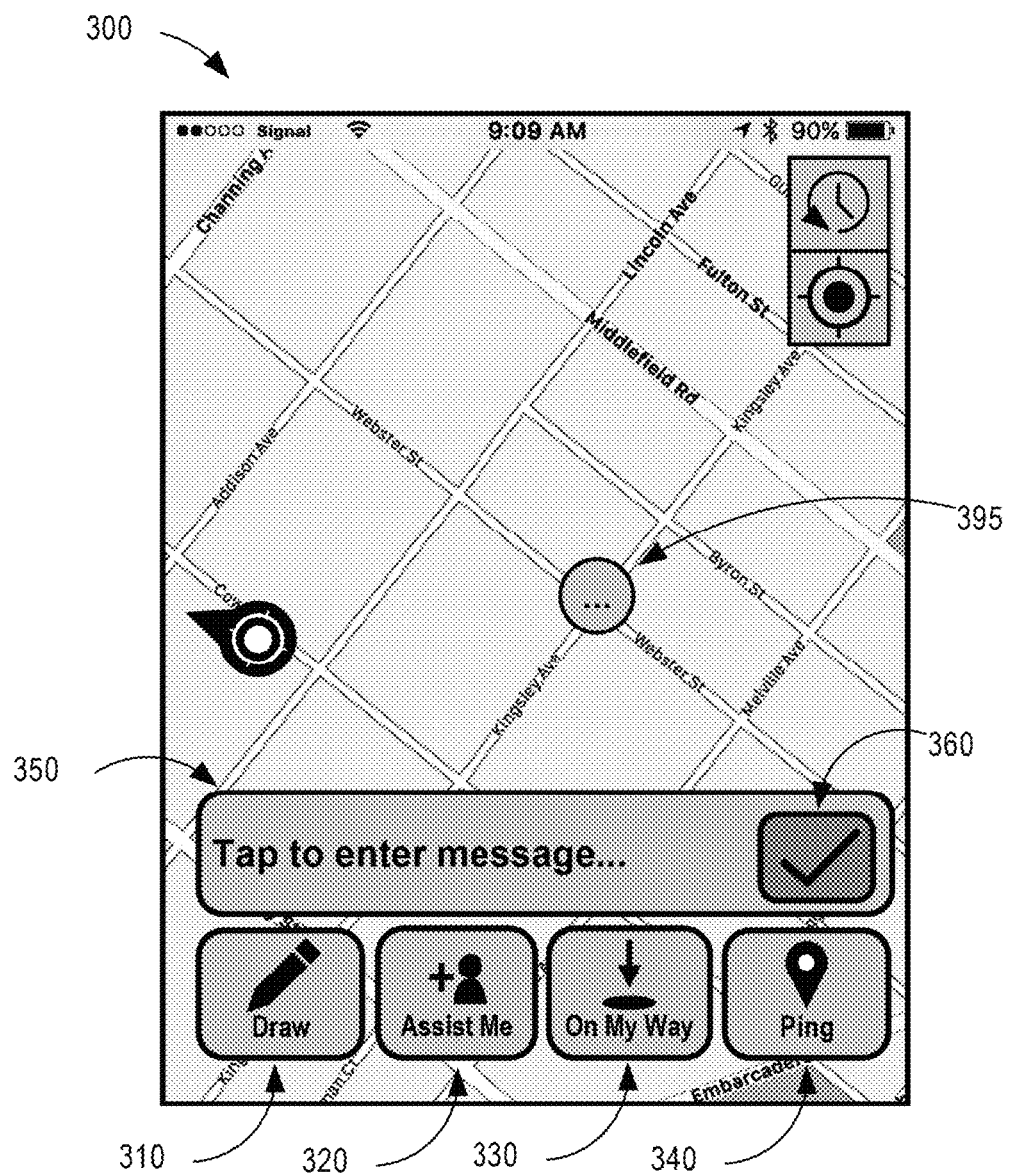
FIG. 3 illustrates an example graphical map for generating enriched pin data, according to one embodiment.

Some map pins may be generated by a mobile device 110 based on input received from a user. FIG. 3 illustrates an example graphical map 300 for generating map pin based on user input. A user may select a point for generating enriched pin data. In this example, a user has interacted with the graphical map 300, for example, via a long-press touch gesture at a position as denoted by temporary map pin 395. Temporary map pin 395 is a placeholder that indicates to a user where a map pin is being created.

Graphical map 300 includes menu options 310, 320, 330, and 340 for creating enriched pin data for map pins of different map pin types. Menu option 310 may be used for the generation of enriched pin data for a drawing map pin. Menu option 320 may be used for the generation of enriched pin data for an assistance map pin. Menu option 330 may be used for the generation of enriched pin data for a travel route map pin. Menu option 340 may be used for the generation of enriched pin data for a ping map pin. Further details regarding each of these map pin types will be described herein, however, additional map pin types may also exist.

Graphical map 300 may include a text box 350 for a user to provide text data to be included as a media element in enriched pin data at the time of generating enriched pin data. Graphical map 300 may include submit button 360 for finalizing and generating the enriched pin data.

2.5 Ping Map Pin

A ping map pin is a type of map pin that can be used to display enriched pin data that represents a particular location in a graphical map. A ping map pin is unique from a positional map pin because it can be generated based on user input and/or it may be generated based on a particular location separate from the location of a mobile device.

Figure 4A:
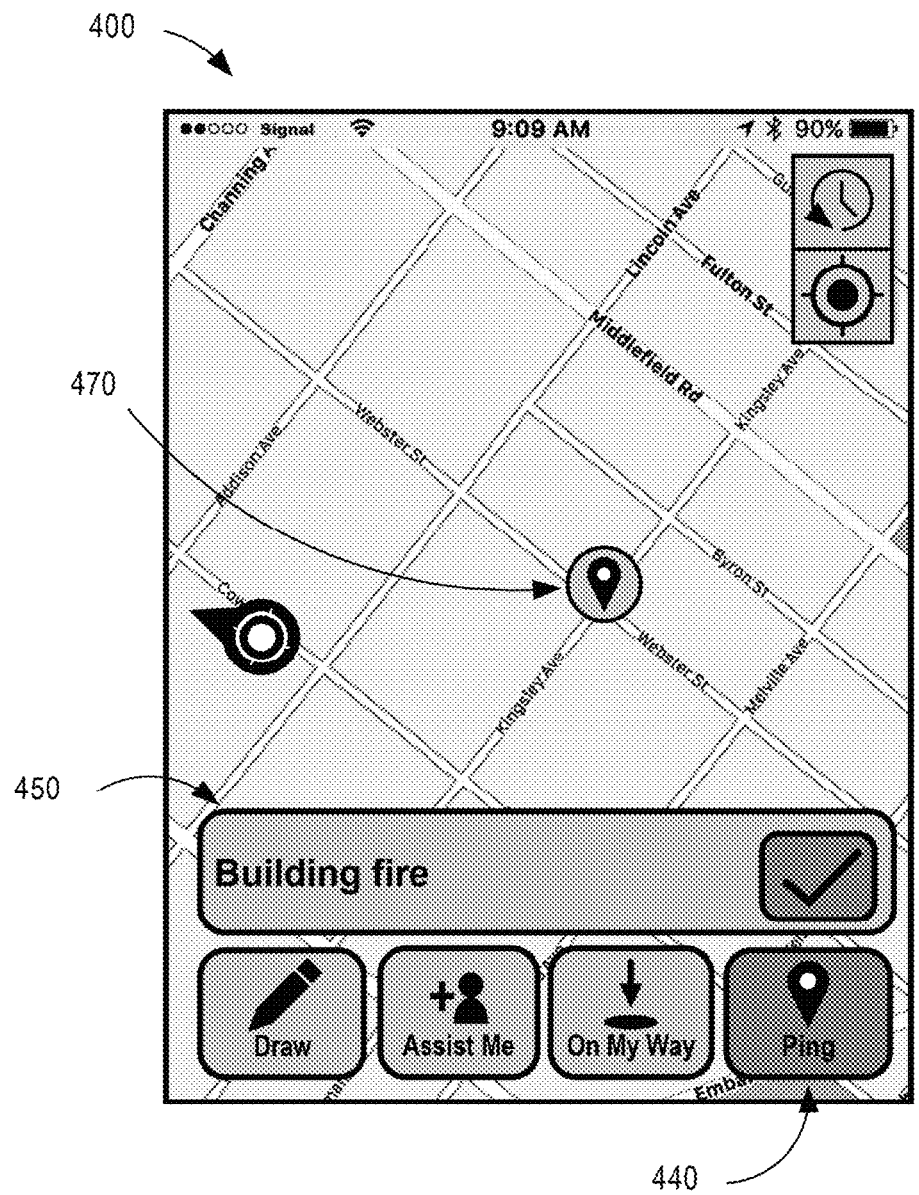
FIG. 4A and FIG. 4B illustrate example graphical maps for generating, interacting with, and displaying ping map pins.

FIG. 4A illustrates an example graphical map 400 of a mobile device 110 that generates enriched pin data for a ping map pin 470. The enriched pin map data for ping map pin 470 may be generated based on user interaction with menu option 440. Unique text associated with ping map pin 470 may be included in text box 450. In this particular example, the text box 450 includes the text "Building fire" to notify team members with a description of what is happening at the location associated with ping map pin 470. Thus, the content of text box 450 may be used as a media element in the ping map pin 470. In other embodiments, additional media elements may be included in the ping map pin, such as image data, video data, audio data, or any other information. The enriched pin map data for ping map pin 470 may be sent from mobile device 110 to a mobile device 120.

Figure 4B:
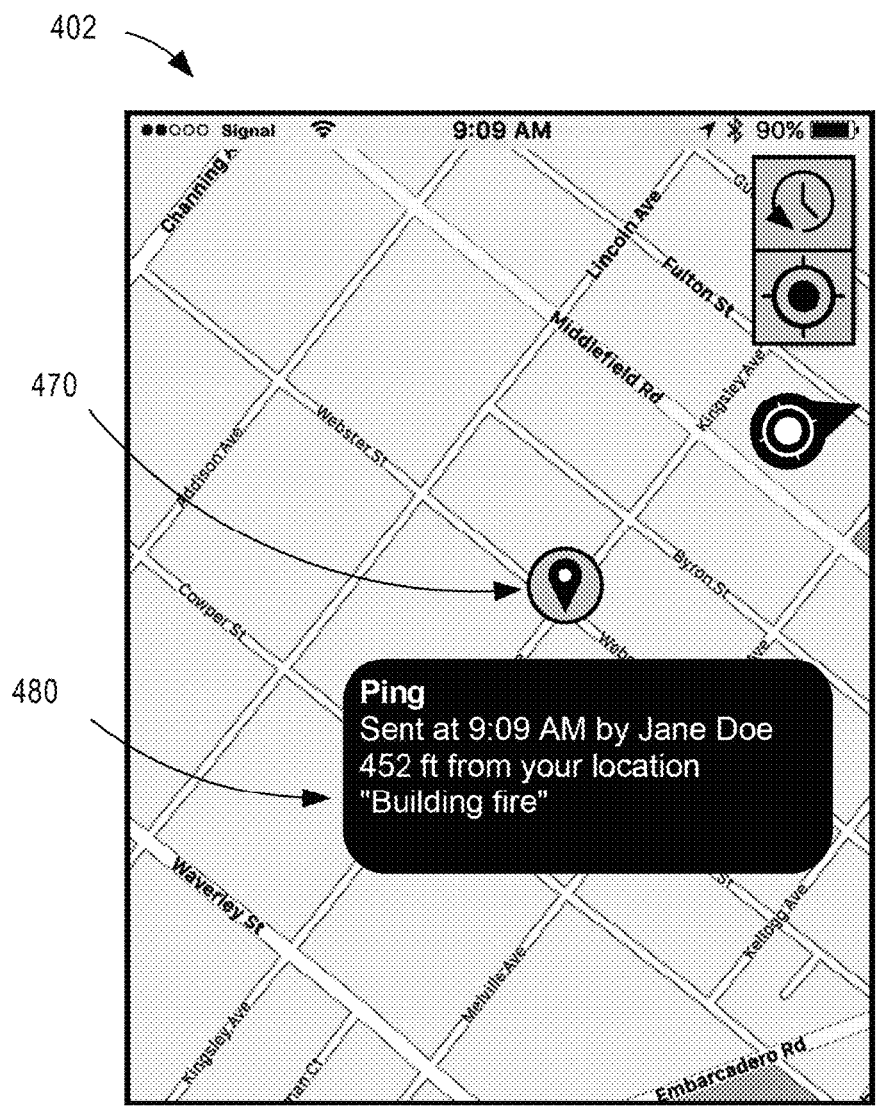

FIG. 4B illustrates an example graphical map 402 of a mobile device 120 that has received enriched pin data for ping map pin 470. The mobile device 120 may display the ping map pin 470 on the graphical map 402 based on the underlying received enriched pin map data. Upon interacting with ping map pin 470, such as via a touch gesture, graphical map 402 displays a map pin popup 480. Map pin popup 480 includes a description of the map pin type as a "Ping" map pin. Map pin popup 480 includes a timestamp value that indicates when the ping map pin 470 was sent to be "Sent at 9:09 AM". Map pin popup 480 includes an indicator that indicates the sender of the ping map pin 470 as "Jane Doe". Map pin popup 480 includes a calculation of the relative distance of the ping map pin 470 from the current position of the current user's mobile device "452 ft from your location". In one embodiment, the relative distance may be calculated by mobile device 120 in real-time and adjusted on the fly as the relative distance changes. Map pin popup 480 further includes a text description of "Building fire", which is an example of a media element that was provided via text box 450, although, in different embodiments, different media elements may be displayed.

Thus, a user can use a ping map pin 470 to convey information regarding a particular location on a graphical map to team members.

2.6 Assistance Map Pin

An assistance map pin is a type of map pin that can be used to display enriched pin data that represents a particular location in a graphical map where a team member requires additional assistance.

Figure 5A:
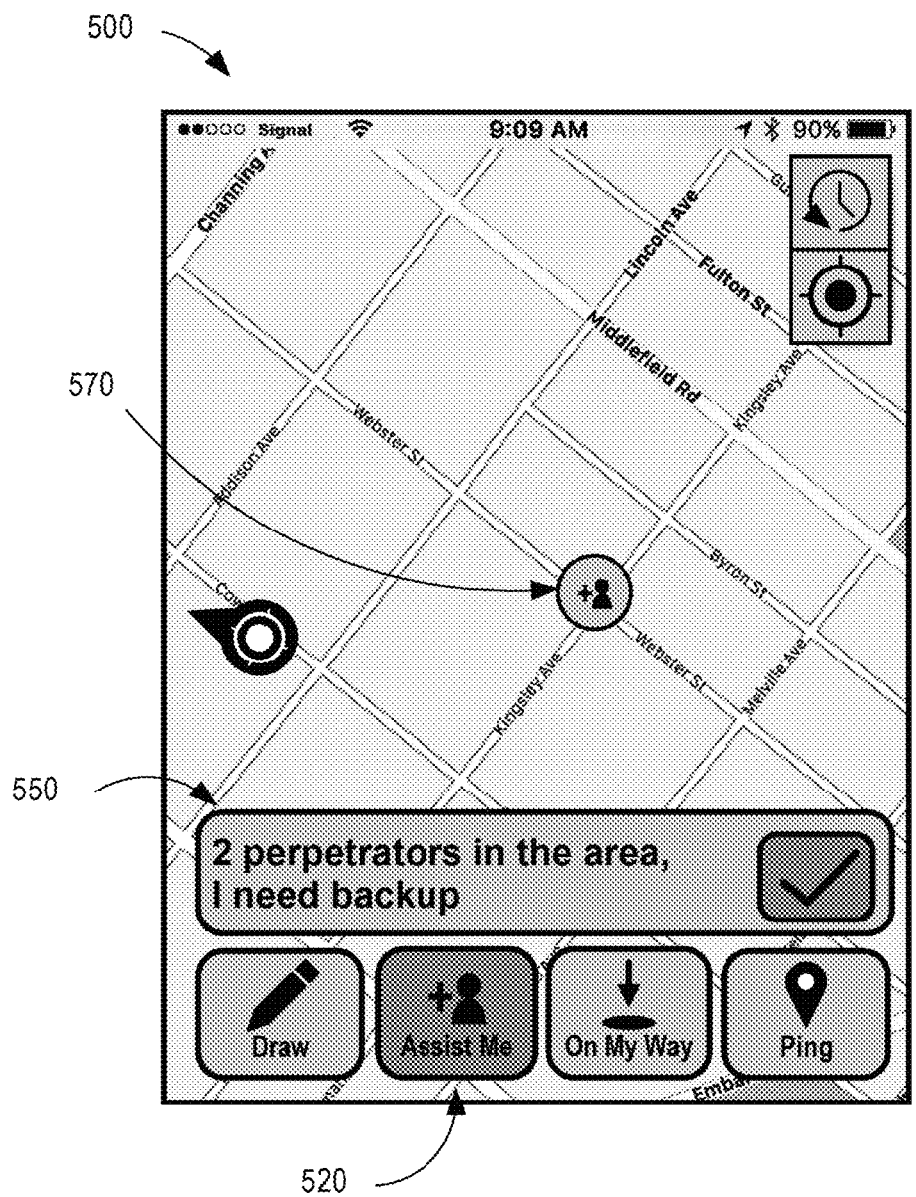
FIG. 5A and FIG. 5B illustrate example graphical maps for generating, interacting with, and displaying with assistance map pins.

FIG. 5A illustrates an example graphical map 500 of a mobile device 110 that generates enriched pin data for an assistance map pin 570. The enriched pin map data for assistance map pin 570 may be generated based on user interaction with menu option 520. Unique text associated with assistance map pin 570 may be included in text box 550. In this particular example, the text box 550 includes the text "2 perpetrators in the area, I need backup" to notify team members with a description of what is happening at the location associated with assistance map pin 570. Thus, the content of text box 550 may be used as a media element in the enriched pin data associated with the assistance map pin 570. In other embodiments, additional media elements may be included in the assistance map pin, such as image data, video data, audio data, or any other information. The enriched pin map data for assistance map pin 570 may be sent from mobile device 110 to a mobile device 120.

Figure 5B:
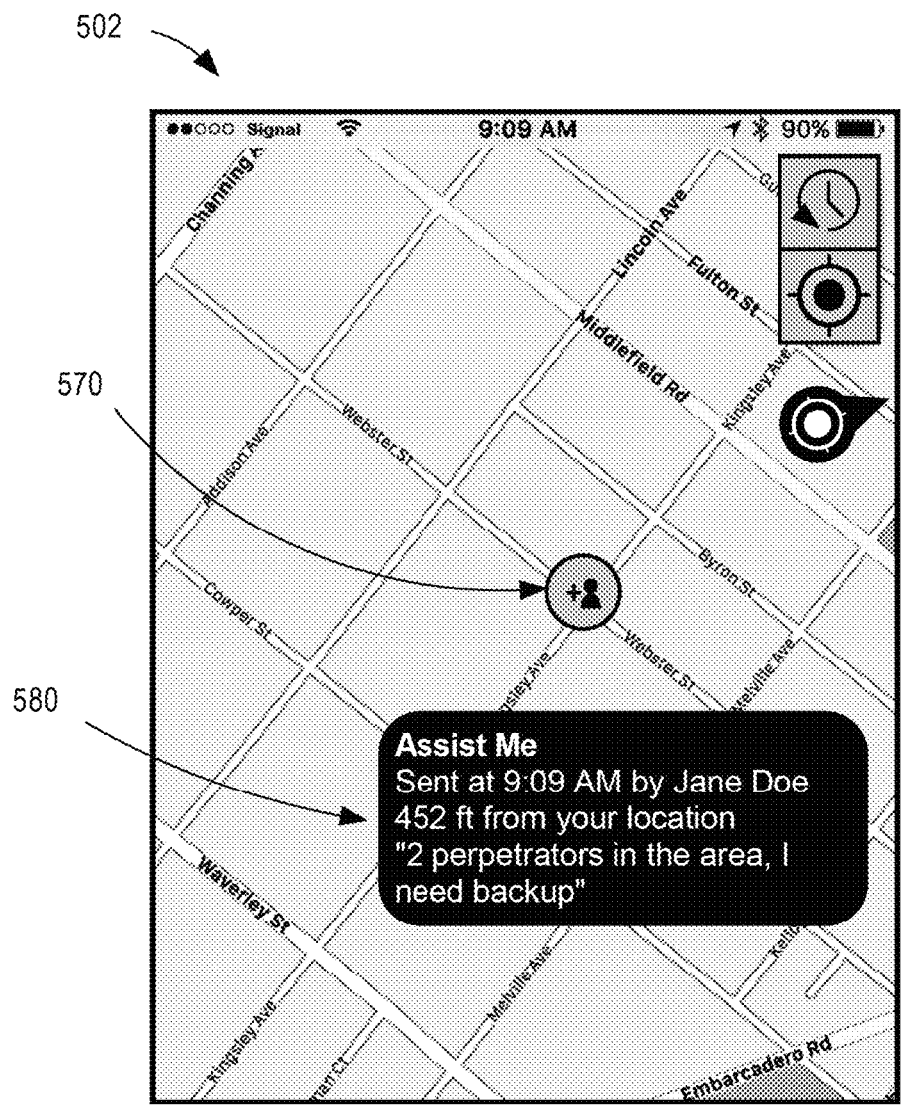

FIG. 5B illustrates an example graphical map 502 of a mobile device 120 that has received enriched pin data for assistance map pin 570. The mobile device 120 may display the assistance map pin 570 on the graphical map 502 based on the underlying received enriched pin map data. Upon interacting with assistance map pin 570, such as via a touch gesture, graphical map 502 displays a map pin popup 580. Map pin popup 580 includes a description of the map pin type as an assistance map pin with the description "Assist Me". Map pin popup 580 includes a timestamp value that indicates when the assistance map pin 570 was sent to be "Sent at 9:09 AM". Map pin popup 480 includes an indicator that indicates the sender of the assistance map pin 570 as "Jane Doe". Map pin popup 580 includes a calculation of the relative distance of the assistance map pin 570 from the current position of the current user's mobile device "452 ft from your location". In one embodiment, the relative distance may be calculated by mobile device 120 in real-time and adjusted on the fly as the relative distance changes. Map pin popup 580 further includes a text description of "2 perpetrators in the area, I need backup", which is an example of a media element that was provided via text box 450, although, in different embodiments, different media elements may be displayed.

Thus, a user can use an assistance map pin 570 to convey information requiring assistance of other team members to their team.

2.7 Travel Route Map Pin

A travel route map pin is a type of map pin that can be used to display enriched pin data that represents that a team member associated with a particular mobile device is on its way to a particular location in a graphical map.

Figure 6A:
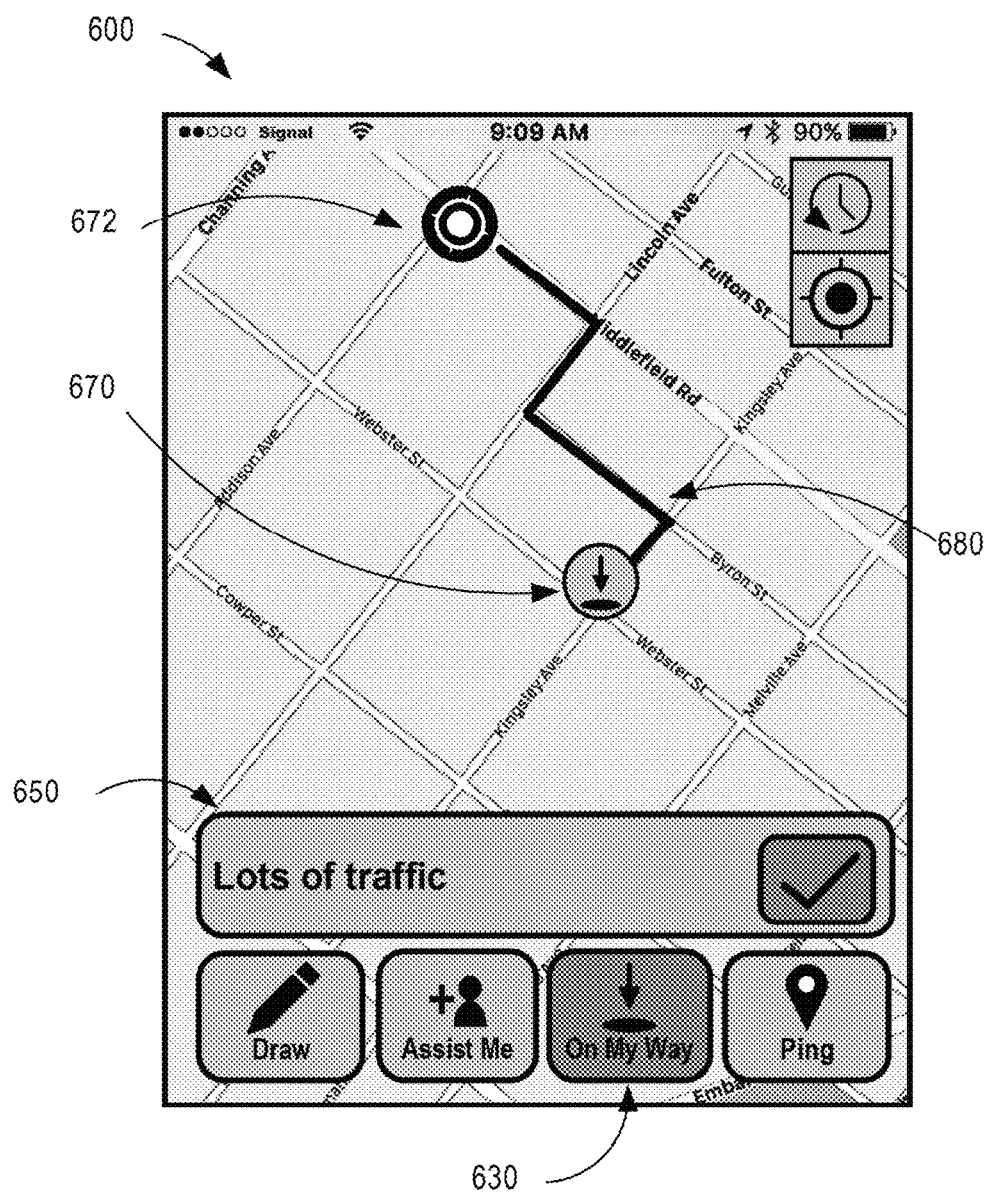
FIG. 6A and FIG. 6B illustrate example graphical maps for generating, interacting with, and displaying with travel route map pins.

FIG. 6A illustrates an example graphical map 600 of a mobile device 110 that generates enriched pin data for a travel route map pin 670. The enriched pin map data for travel route map pin 670 may be generated based on user interaction with menu option 630. Unique text associated with travel route map pin 670 may be included in text box 650. In this particular example, the text box 650 includes the text "Lots of traffic" to notify team members with a description of whatever the user wants to describe in association with travel route map pin 670. Thus, the content of text box 650 may be used as a media element in the enriched pin data associated with the travel route map pin 670. In other embodiments, additional media elements may be included in the travel route map pin, such as image data, video data, audio data, or any other information. The enriched pin map data for travel route map pin 670 may be sent from mobile device 110 to a mobile device 120.

In one embodiment, enriched pin data for travel route map pin 670 may include travel route data that represents a travel route 680 from a current position of mobile device 110 as indicated by positional pin 672 and the destination position of travel route map pin 670 as an additional media element. Such travel route data may be represented, for example, by a series of coordinates with latitude and longitude values that represent the intended travel route. Travel route data may also include additional data regarding mode of transportation as provided by the user generating the travel route map pin 670, such as walking, car, mass transit, etc. In one embodiment, travel route data may include an estimated time of arrival at the location associated with travel route map pin 670 as a media element. In another embodiment, some or all of the travel route data may be omitted from the enriched pin data, and may instead be estimated or calculated by the receiving mobile device 120 based on the positional pin 672.

Figure 6B:
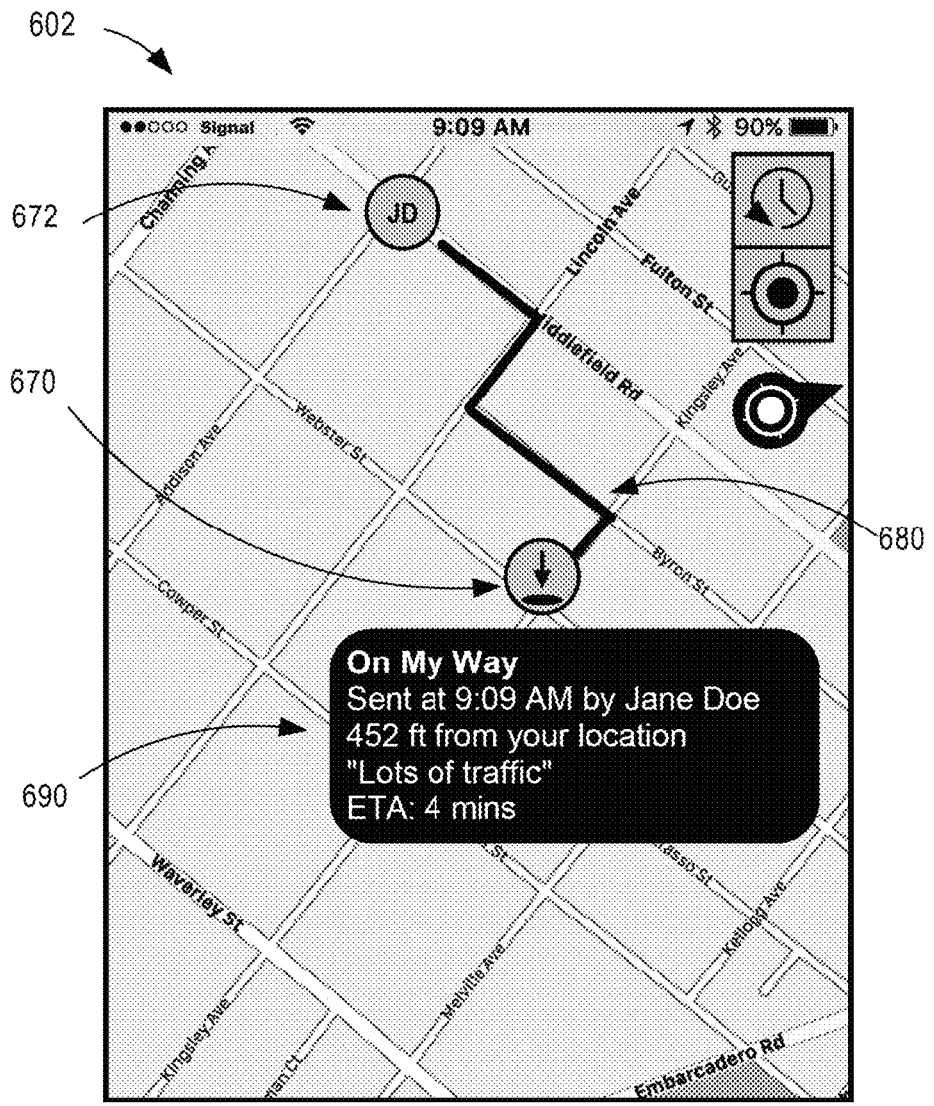

FIG. 6B illustrates an example graphical map 602 of a mobile device 120 that has received enriched pin data for travel route map pin 670. The mobile device 120 may display the travel route map pin 670 on the graphical map 602 based on the underlying received enriched pin map data. In one embodiment, travel route 680 may be displayed on graphical map 602 based on travel route data included in the enriched pin data. In another embodiment, travel route 680 may be displayed on graphical map 602 based on calculations performed by mobile device 120 to determine a route of travel from the position of a positional pin 672 representing the sender of the travel route map pin 670 and the position of the travel route map pin 670.

Upon interacting with travel route map pin 670, such as via a touch gesture, graphical map 602 displays a map pin popup 690. Map pin popup 690 includes a description of the map pin type as a travel route map pin with the description "On My Way". Map pin popup 690 includes a timestamp value that indicates when the travel route map pin 670 was sent to be "Sent at 9:09 AM". Map pin popup 690 includes an indicator that indicates the sender of the travel route map pin 670 as "Jane Doe". Map pin popup 690 includes a calculation of the relative distance of the travel route map pin 670 from the current position of the current user's mobile device as "452 ft from your location". In one embodiment, the relative distance may be calculated by mobile device 120 in real-time and adjusted on the fly as the relative distance changes based on changes to the current position of the current user's mobile device. Map pin popup 690 further includes a text description of "Lots of traffic", which is an example of a media element that was provided via text box 650, although, in different embodiments, different media elements may be displayed. Map pin popup 690 further includes an estimated time of arrival (ETA) of "4 mins" for the sender of the enriched pin data. In one embodiment, ETA may be a media element that was included in the enriched pin data that was sent by mobile device 110. In another embodiment, ETA may be calculated by mobile device 120 based on the position of positional map pin 672 for the sender mobile device and the expected path of travel. Such an ETA may be recalculated as the positional map pin 672 changes position using algorithms for determining a path of travel, such as Djikstra's algorithm.

Thus, a user can use a travel route map pin 670 to convey information regarding a route of travel in a graphical map to team members.

2.8 Drawing Map Pin

A drawing map pin is a type of map pin that can be used to display enriched pin data that represents a drawing on a graphical map. Such a drawing may be a freeform drawing on a graphical map, a shape-based drawing on a graphical map, or text to be overlaid on top of the graphical map.

Figure 7A:
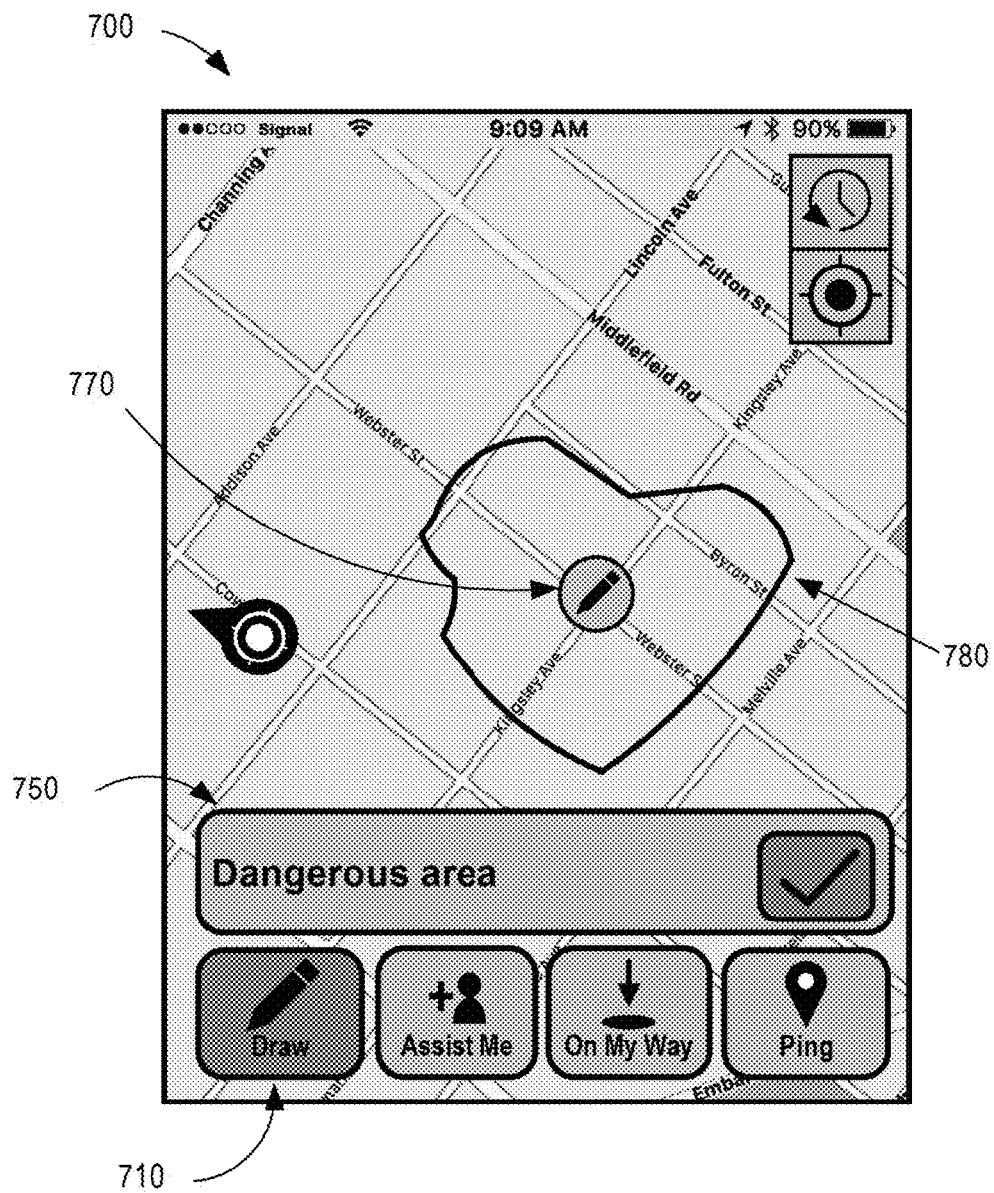
FIG. 7A and FIG. 7B illustrate example graphical maps for generating, interacting with, and displaying with drawing map pins.

FIG. 7A illustrates an example graphical map 700 of a mobile device 110 that generates enriched pin data for a drawing map pin 770. The enriched pin map data for drawing map pin 770 may be generated based on user interaction with menu option 710. Unique text associated with drawing map pin 770 may be included in text box 750. In this particular example, the text box 750 includes the text "Dangerous area" to notify team members with a description of whatever the user wants to describe in association with drawing map pin 670. Thus, the content of text box 750 may be used as a media element in the enriched pin data associated with the drawing map 770. In other embodiments, additional media elements may be included in the drawing map pin, such as image data, video data, audio data, or any other information. The enriched pin map data for drawing map pin 770 may be sent from mobile device 110 to a mobile device 120.

In one embodiment, enriched pin data for drawing map pin 770 may include drawing data that represents drawing on the graphical map 700 as generated based on user input. In one embodiment, drawing data may represent a freeform drawing 780 made by a user, and may be stored as a series of coordinates with latitude and longitude values that represent the freeform drawing. The series of coordinates can thus be used to generate a curve representing the freeform drawing. In one embodiment, mobile device 110 may use a curve smoothing algorithm to remove one or more coordinates from series of coordinates in order minimize the amount of data that needs to be transmitted as part of enriched pin data, thereby improving system performance.

In one embodiment, drawing data may include a shape-based drawing on top of graphical map 700. For example, a user may be allowed to create polygonal shapes on graphical map, and scale the size accordingly. Such polygonal shapes may include rectangles, ovals, triangles, or any other shape. Data representing the polygonal shape may be stored as part of enriched pin data for the drawing map pin 770. In another embodiment, drawing data may include a text-based drawing to be overlaid on top of graphical map 700.

Figure 7B:
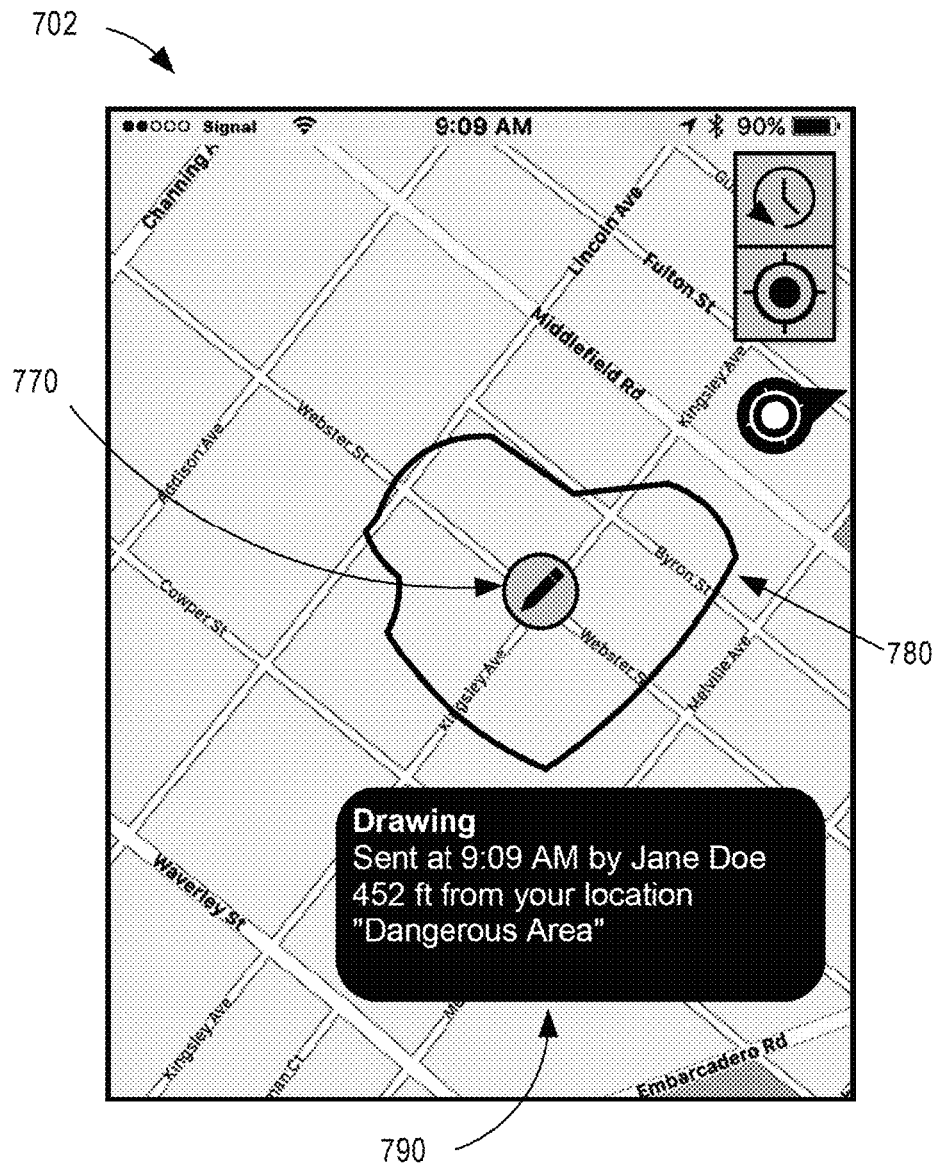

FIG. 7B illustrates an example graphical map 702 of a mobile device 120 that has received enriched pin data for travel route map pin 670. The mobile device 120 may display the drawing map pin 770 on the graphical map 602 based on the underlying received enriched pin map data. In one embodiment, drawing 780 may be displayed based on drawing data included in the enriched pin data.

Upon interacting with drawing map pin 770, such as via a touch gesture, graphical map 702 displays a map pin popup 790. Map pin popup 790 includes a description of the map pin type as drawing map pin with the description "Drawing". Map pin popup 790 includes a timestamp value that indicates when the drawing map pin 770 was sent to be "Sent at 9:09 AM". Map pin popup 790 includes an indicator that indicates the sender of the drawing map pin 770 as "Jane Doe". Map pin popup 790 includes a graphical depiction of drawing 780 as determined by drawing data included in enriched pin data associated with drawing map pin 770. Thus, a user can use a drawing map pin 770 to convey information regarding a geographical area using drawing on a graphical map to team members.

2.9 Message Chain History

In addition to displaying map pins in a graphical map, a mobile device 120 may also display map pins in a message chain history. A message history is a tabular format for displaying map pins.

Figure 8:
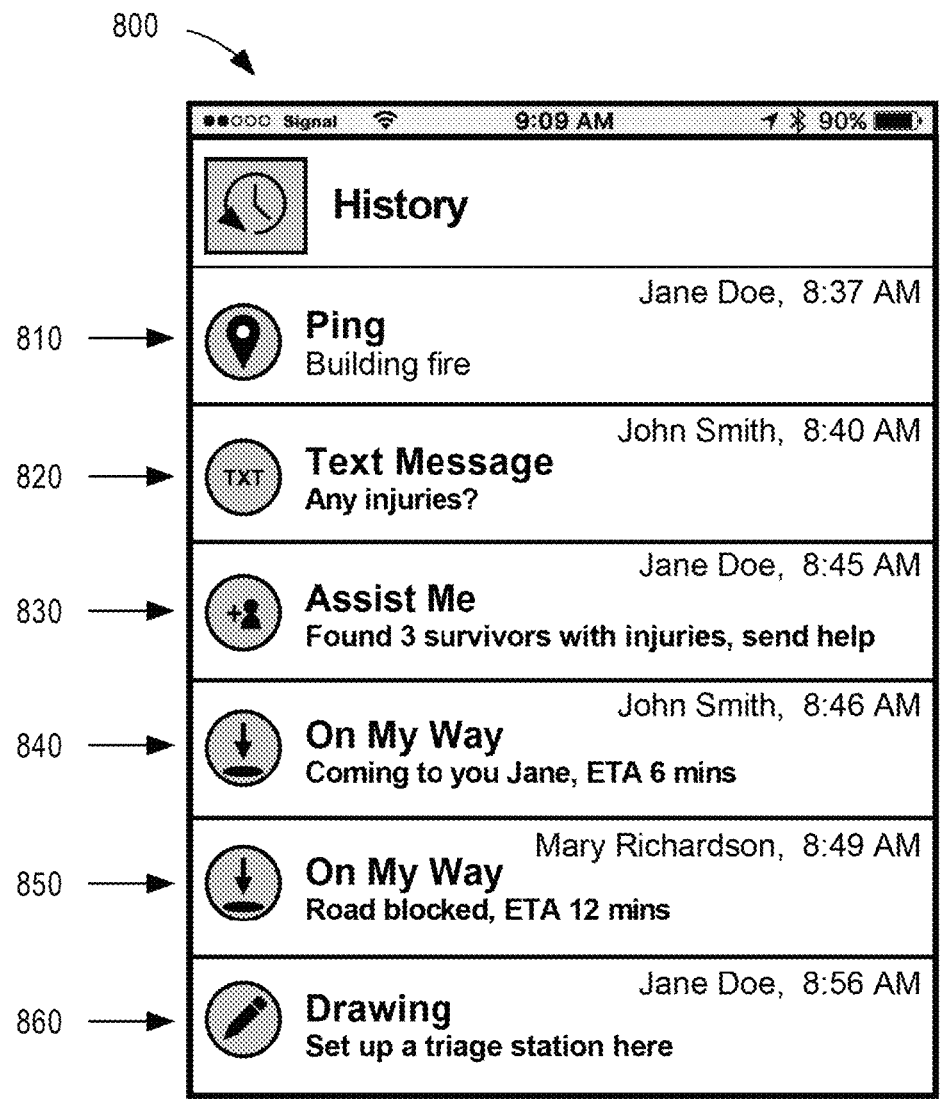
FIG. 8 illustrates an example message chain history, according to one embodiment.

FIG. 8 illustrates an example of a message chain history 800. Message chain history 800 includes message entries 810, 820, 830, 850, 850, 860. Each message entry represents an event in the geographical messaging system and corresponds to either a map pin that has been sent to a team or a text message that has been sent to a team. For example, in the example of message chain history 800, message entries 810, 830, 850, 850, 860 each correspond to message entry type that is associated with a map pin with underlying enriched pin data. On the other hand, message entry 820 corresponds to a message entry type for a text message that does not correspond to a map pin or enriched pin data. For example, message entry 820 may be associated with a short message service (SMS) text message. Thus, message chain history 800 allows for the integration of message communications via map pins with regular text messages.

In one embodiment, each message entry may include an icon that is determined based on the message entry type and/or associated map pin type of the enriched pin data.

In one embodiment, each message entry may include a description of the message entry type and/or associated map pin type. For example, message entry 820 indicates a message entry type of "Text Message", whereas message entry 810 indicates a map pin type of "Ping".

In one embodiment, each message entry may include an indication as to the sender of the message entry and a timestamp value associated with the message entry. For example, message entry 810 was sent by Jane Doe at 8:37 AM. This information may be determined, for example, based on the enriched pin data associated with message entry 810.

In one embodiment, each message entry may additionally include additional media elements based on enriched pin data. In one embodiment, a user may mark a message entry as read or delete a message entry to remove it from message chain history 800.

In one embodiment, message entries in message chain history 800 may be sorted based on one or more factors, such as timestamp values, sender identifier, map pin type, expiration timestamp value, or any other feature of the message entries.

In one embodiment, a user may interact with a message entry in message chain history 800 that represents a map pin to position their graphical map on the map pin. This allows users to quickly and easily find a map pin, using the message chain history 800 and locate it in the graphical map.

2.10 Additional Features

In one embodiment, enriched pin data may include expiration data. Such expiration data may be configured as a system setting or may be specified by a user at the time of generating enriched pin data. Upon reaching an expiration time stamp, the map pin associated with enriched pin data may be deleted or removed from all graphical maps. This helps to prevent map pins from overly cluttering graphical maps, by removing them when they are no longer necessary.

In one embodiment, a mobile device may be programmed or configured to allow a user to manually delete, mark as hidden, or mark as read a map pin. For example, a user may perform these actions via a map pin popup or via the message chain history. By performing such an action, the underlying map pin may be removed from their mobile device's graphical map and/or removed from all mobile device's graphical maps in the geographical messaging system.

In one embodiment, a mobile device may be programmed or configured to allow a user to manually edit enriched pin data associated with an existing map pin. For example, they may edit or add media elements to the enriched pin data associated with the map pin. This allows for users to add supplementary information to a map pin over time, thereby allowing them to supplement additional information to their team members.

In one embodiment, an SOS map pin is a type of map pin that may be quickly and easily generated by mobile device with minimal user interaction. For example, an SOS map pin may be generated without providing any text or other user inputs aside from a single button press. This allows a user to quickly notify team members of an emergency.

In one embodiment, a mobile device may be programmed or configured to only display map pins that are located within a threshold distance of the mobile device geographically. Such a threshold distance may be specified by a system-wide setting or a setting specific to a mobile device. For example, a user may specify a threshold distance that only displays map pins within 1 mile of the mobile device. This allows a user to customize how many map pins they want to see. This is especially helpful for large teams where there can be a considerable number of map pins available.

In one embodiment, a mobile device may be programmed or configured to allow a user to flag a map pin, such as denoting a particular color, a favorite, or increasing a higher priority. In one embodiment, a higher priority map pin may be displayed with specific graphical characteristics to team members. For example, a high priority map pin may be enlarged, flashing, or animated. This allows a user to emphasize important map pins for team members to pay attention to.

2.11 Application Areas

The present techniques may be used by any teams that have geographically-sensitive information. Example application areas include first responders, fire departments, humanitarian relief, law enforcement, military tactical deployments, search and rescue operations, news reporting teams, and other location-based teams.

Additionally, the present techniques may be used for social networking purposes to allow users to easily communicate and coordinate plans with friends and acquaintances. For example, a user could set up a meeting point for a restaurant outing with a series of friends using a location-based map pin or a rendezvous point for a date in a dating app.

The present techniques provide for efficient communication between members of a team that provides more enhanced communication than a traditional text message or email would. The availability of geographical-based map pins integrated with a graphical map allows for team members to quickly and easily convey map-based data in real time to one another. Information can be easily disseminated to an entire team in a geographical area and updated on the fly by team members.

3.0 EXAMPLE PROCESS AND ALGORITHM

Figure 9:
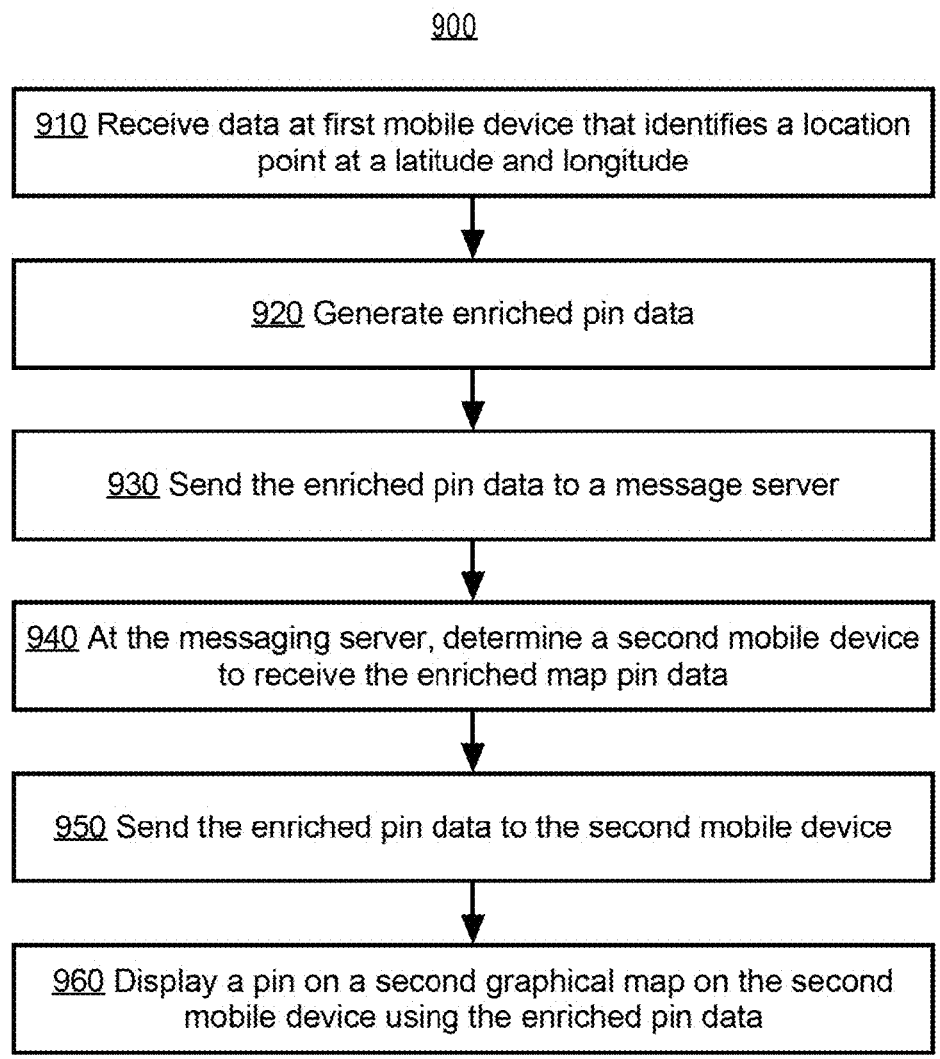
FIG. 9 illustrates a flow diagram for short message communication using a geographical messaging system, according to one embodiment.

FIG. 9 illustrates a flow diagram of an example process 900 for short message communication using a geographical messaging system, according to one embodiment. FIG. 9 is intended to disclose an algorithm or functional description that may be used as a basis of writing computer programs to implement the functions that are described herein and which cause a computer to operate in the new manner that is disclosed herein. Further, FIG. 9 is provided to communicate such an algorithm at the same level of detail that is normally used, by persons of skill in the art to which this disclosure is directed, to communicate among themselves about plans, designs, specifications and algorithms for other computer programs of a similar level of complexity.

The process 900 may start at step 910. At step 910, a first mobile device 110 is programmed or configured to receive data that identifies a location point located at a particular latitude value and longitude value. In the example of a positional map pin, the location point may be determined automatically by the first mobile device 110 based on the position of the first mobile device 110 as determined, for example, by a GPS system. In the examples of other types of map pins, the location point may be determined based on user-provided input. Such user-provided input may include a user interaction with a touch screen, input via a keyboard or styles, or any other user input on the first mobile device 110. In one embodiment, the data may include media elements, such as image data, video data, audio data, text data, or any other supplementary data. Such media elements may be received via user input on the first mobile device 110. The process 900 may then proceed to step 920.

In step 920, the first mobile device 110 is programmed or configured to generate enriched pin data based on the data received in step 910. Enriched pin data includes the latitude value of the location point and longitude value of the location point. Enriched pin data may additionally include data received via user input, such as one or more media elements. Enriched pin data may also include a timestamp value for the time that the enriched pin data was generated. Enriched pin data may also include an identifier of the sender of the enriched pin data, such as the name of the owner of the mobile device, the name of the mobile device, or some other similar identifier. In one embodiment, the identifier of the sender of the enriched pin data may be provided by user input, but in another embodiment, it may be determined based on a setting of the first mobile device 110. The process 900 may then proceed to step 930.

In step 930, the first mobile device 110 is programmed or configured to send the enriched pin data generated in step 920 to a messaging server 140 via network 130. In an embodiment, first mobile device 110 may send the enriched pin data using one or more wireless transmission protocols. The process 900 may then proceed to step 940.

In step 940, the messaging server 140 is programmed or configured to determine a second mobile device 120 to receive the enriched pin data. In one embodiment, the messaging server 140 may previously store information about the team members associated with first mobile device 110 and their associated potential recipient mobile devices. This stored information may include information about the position of each of the potential recipient mobile devices. In one embodiment, messaging server 140 may thus use that stored information to identify all mobile devices that could receive the enriched pin data in order to broadcast the enriched pin data to all such mobile devices. In another embodiment, messaging server 140 may additionally determine whether potential recipient mobile devices for team members are within a geographical distance threshold of the first mobile device 110 and will only send the enriched pin data to the second mobile device 120 if it is within the geographical distance threshold. In another embodiment, messaging server 140 may additionally determine whether the potential recipient mobile devices have appropriate security permission to receive the enriched pin data before broadcasting the enriched pin data to the recipient mobile device. If a recipient mobile device does not have appropriate permissions, the messaging server 140 will not send the enriched pin data to it. Based on this criteria, the messaging server 140 may determine at least one second mobile device 120 to receive the enriched pin data. The process 900 may then proceed to step 950.

In step 950, the messaging server 940 is programmed or configured to send the enriched pin data to one or more second mobile devices 120 as determined during step 940. In one embodiment, the messaging server 940 will broadcast the enriched pin data to all such mobile devices. In one embodiment, messaging server 940 may send a push notification to second mobile device 120 that includes enriched pin data. The messaging server 940 may send the enriched pin data to second mobile device 120 using network 130. The process 900 may then proceed to step 960.

In step 960, the second mobile device 120 is programmed or configured to uses the enriched pin data sent during 950 to display, on a second graphical map of the second mobile device, a map pin using the enriched pin data. The position of the map pin on the second graphical map is determined based on the latitude value and the longitude value in the enriched pin data. In one embodiment, upon interacting with the map pin on the second graphical map, a map pin popup may be displayed that may display additional information regarding the map pin such as media elements, timestamp value, sender information, and any other information related to the enriched pin data. In another embodiment, this additional information may be displayed without requiring user input. The process 900 may then end.

In an alternative embodiment of process 900, the steps 930, 940 and 950 may be omitted and instead, the first mobile device 110 may be programmed or configured to send the enriched pin data directly to second mobile device 120 without using messaging server 140.

4.0 IMPLEMENTATION MECHANISMS—HARDWARE OVERVIEW

Figure 10:
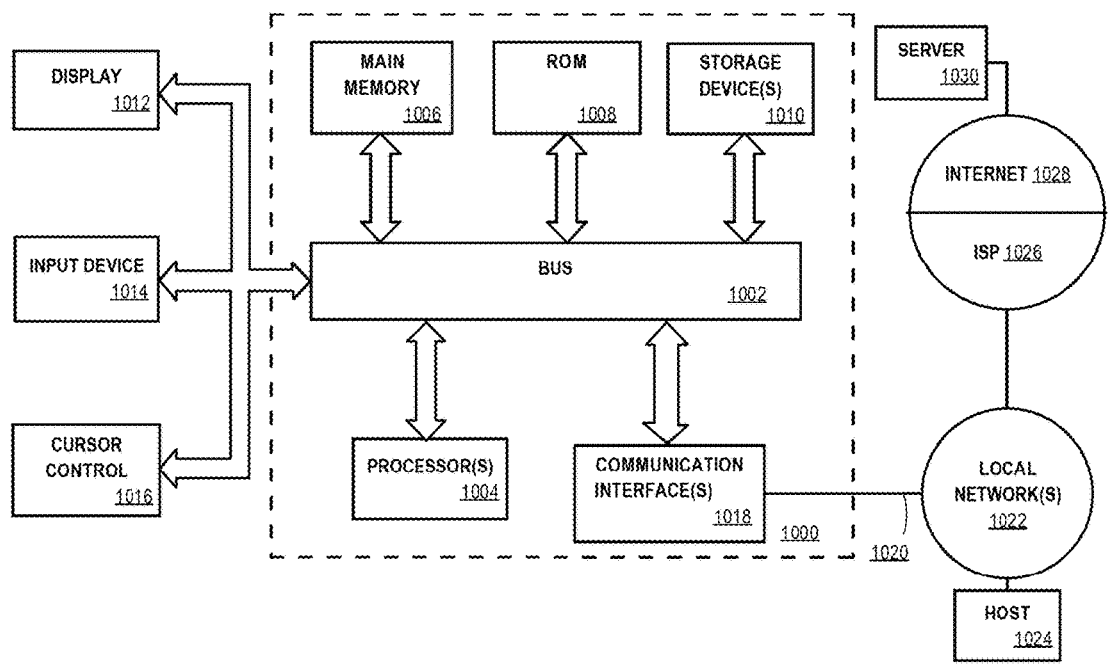
FIG. 10 is a block diagram of a computing device in which the example embodiment(s) of the present invention may be embodied.

Referring now to FIG. 10, it is a block diagram that illustrates a computing device 1000 in which the example embodiment(s) of the present invention may be embodied. Computing device 1000 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1000 may include a bus 1002 or other communication mechanism for addressing main memory 1006 and for transferring data between and among the various components of device 1000.

Computing device 1000 may also include one or more hardware processors 1004 coupled with bus 1002 for processing information. A hardware processor 1004 may be a general purpose microprocessor, a system on a chip (SoC), or other processor.

Main memory 1006, such as a random access memory (RAM) or other dynamic storage device, also may be coupled to bus 1002 for storing information and software instructions to be executed by processor(s) 1004. Main memory 1006 also may be used for storing temporary variables or other intermediate information during execution of software instructions to be executed by processor(s) 1004.

Software instructions, when stored in storage media accessible to processor(s) 1004, render computing device 1000 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1000 also may include read only memory (ROM) 1008 or other static storage device coupled to bus 1002 for storing static information and software instructions for processor(s) 1004.

One or more mass storage devices 1010 may be coupled to bus 1002 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1010 (e.g., the main hard disk for the device) stores a body of program and data for directing operation of the computing device, including an operating system, user application programs, driver and other support files, as well as other data files of all sorts.

Computing device 1000 may be coupled via bus 1002 to display 1012, such as a liquid crystal display (LCD) or other electronic visual display, for displaying information to a computer user. In some configurations, a touch sensitive surface incorporating touch detection technology (e.g., resistive, capacitive, etc.) may be overlaid on display 1012 to form a touch sensitive display for communicating touch gesture (e.g., finger or stylus) input to processor(s) 1004.

An input device 1014, including alphanumeric and other keys, may be coupled to bus 1002 for communicating information and command selections to processor 1004. In addition to or instead of alphanumeric and other keys, input device 1014 may include one or more physical buttons or switches such as, for example, a power (on/off) button, a "home" button, volume control buttons, or the like.

Another type of user input device may be a cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

While in some configurations, such as the configuration depicted in FIG. 10, one or more of display 1012, input device 1014, and cursor control 1016 are external components (i.e., peripheral devices) of computing device 1000, some or all of display 1012, input device 1014, and cursor control 1016 are integrated as part of the form factor of computing device 1000 in other configurations.

Functions of the disclosed systems, methods, and modules may be performed by computing device 1000 in response to processor(s) 1004 executing one or more programs of software instructions contained in main memory 1006. Such software instructions may be read into main memory 1006 from another storage medium, such as storage device(s) 1010. Execution of the software instructions contained in main memory 1006 cause processor(s) 1004 to perform the functions of the example embodiment(s).

While functions and operations of the example embodiment(s) may be implemented entirely with software instructions, hard-wired or programmable circuitry of computing device 1000 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more software instructions to processor(s) 1004 for execution. For example, the software instructions may initially be carried on a magnetic disk or solid-state drive of a remote computer. The remote computer can load the software instructions into its dynamic memory and send the software instructions over a telephone line using a modem. A modem local to computing device 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor(s) 1004 retrieves and executes the software instructions. The software instructions received by main memory 1006 may optionally be stored on storage device(s) 1010 either before or after execution by processor(s) 1004.

Computing device 1000 also may include one or more communication interface(s) 1018 coupled to bus 1002. A communication interface 1018 provides a two-way data communication coupling to a wired or wireless network link 1020 that is connected to a local network 1022 (e.g., Ethernet network, Wireless Local Area Network, cellular phone network, Bluetooth wireless network, or the like). Communication interface 1018 sends and receives electrical, electromagnetic, or optical signals that carry digital data streams representing various types of information. For example, communication interface 1018 may be a wired network interface card, a wireless network interface card with an integrated radio antenna, or a modem (e.g., ISDN, DSL, or cable modem).

Network link(s) 1020 typically provide data communication through one or more networks to other data devices. For example, a network link 1020 may provide a connection through a local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network(s) 1022 and Internet 1028 use electrical, electromagnetic or optical signals that carry digital data streams. The signals through the various networks and the signals on network link(s) 1020 and through communication interface(s) 1018, which carry the digital data to and from computing device 1000, are example forms of transmission media.

Computing device 1000 can send messages and receive data, including program code, through the network(s), network link(s) 1020 and communication interface(s) 1018. In the Internet example, a server 1030 might transmit a requested code for an application program through Internet 1028, ISP 1026, local network(s) 1022 and communication interface(s) 1018.

The received code may be executed by processor 1004 as it is received, and/or stored in storage device 1010, or other non-volatile storage for later execution.

5.0 IMPLEMENTATION MECHANISMS—SOFTWARE OVERVIEW

Figure 11:
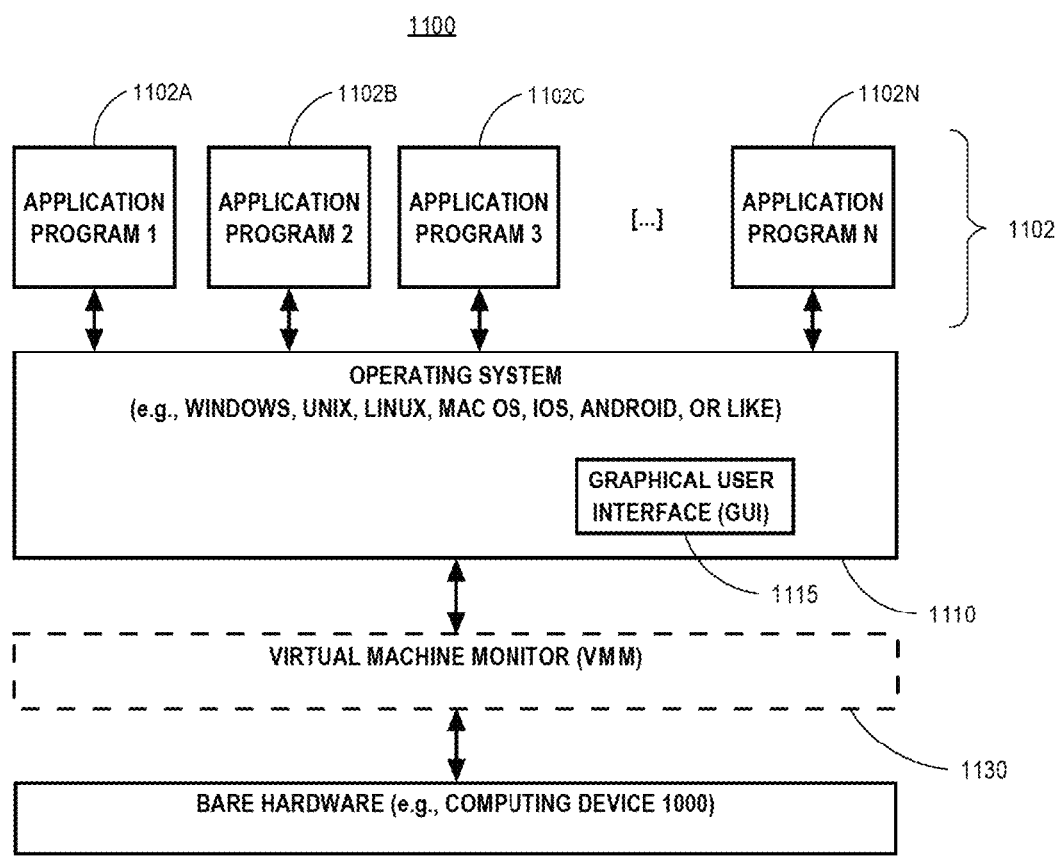
FIG. 11 is a block diagram of a software system for controlling the operation of the computing device.

FIG. 11 is a block diagram of a software system 1100 that may be employed for controlling the operation of computing device 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing device 1000. Software system 1100, which may be stored in system memory (RAM) 1006 and on fixed storage (e.g., hard disk or flash memory) 1010, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by the system 1100. The applications or other software intended for use on device 1100 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of device 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the device 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of device 1000 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 OTHER ASPECTS OF DISCLOSURE

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method comprising:
receiving a first user input, via a first graphical map on a first mobile device, that selects a location point in the first graphical map;
receiving a second user input that provides a media element;
in response to receiving the first user input and the second user input, generating enriched pin data comprising a latitude value representing a latitude position of the point, a longitude value representing a longitude position of the point, a timestamp value, and the media element; and
sending the enriched pin data to a second mobile device to cause to be displayed a pin on a second graphical map on the second mobile device, wherein the pin is positioned on the second graphical map using the latitude value and longitude value, and wherein the pin comprises the user-provided media element and an indicator of the timestamp value;
wherein the method is performed using one or more processors.

2. The method of claim 1, wherein the enriched pin data further comprises information that identifies a sender of the enriched pin data at the first mobile device.

3. The method of claim 1, further comprising, in response to receiving a third user input at the pin on the second mobile device, displaying a popup window on the second graphical map associated with the pin.

4. The method of claim 3, wherein the media element comprises image data and the popup window displays the image data.

5. The method of claim 1, wherein the media element comprises a series of coordinates that represents a freeform drawing, and wherein the method further comprises displaying based on the series of coordinates, a freeform drawing on the second graphical map.

6. The method of claim 1, further comprising:
displaying a message history on the second mobile device comprising a plurality of message entries that includes a first message entry associated with the pin; and
in response to a user interaction with the first message entry, causing to be displayed on the second graphical map the pin.

7. The method of claim 6, wherein the plurality of message entries further comprises a second message entry, wherein the second message entry is associated with a text message.

8. The method of claim 1, wherein the enriched pin data represents a route of travel between a current position of the first mobile device and the point.

9. The method of claim 8, further comprising displaying, on the second graphical map, a route of travel between the current position of the first mobile device and the point.

10. The method of claim 8, further comprising:
determining, by the second mobile device, an estimated time of arrival of the first mobile device at the point; and
displaying the estimated time of arrival on the second graphical map.

11. One or more non-transitory computer-readable media storing instructions, which when executed by one or more processors cause the one or more processors to perform operations comprising:
  receiving a first user input, via a first graphical map on a first mobile device, that selects a location point in the first graphical map;
  receiving a second user input that provides a media element
  in response to receiving the first user input and the second user input, generating enriched pin data comprising a latitude value representing a latitude position of the point, a longitude value representing a longitude position of the point, a timestamp value, and the media element; and
  sending the enriched pin data to a second mobile device to cause to be displayed a pin on a second graphical map on the second mobile device, wherein the pin is positioned on the second graphical map using the latitude value and longitude value, and wherein the pin comprises the user-provided media element and an indicator of the timestamp value.

12. The one or more non-transitory computer-readable media of claim 11, wherein the enriched pin data further comprises information that identifies a sender of the enriched pin data at the first mobile device.

13. The one or more non-transitory computer-readable media of claim 11, further comprising instructions, which when executed by one or more processors cause the one or more processors to perform an operation comprising, in response to receiving a third user input at the pin on the second mobile device, displaying a popup window on the second graphical map associated with the pin.

14. The one or more non-transitory computer-readable media of claim 13, wherein the media element comprises image data and the popup window displays the image data.

15. The one or more non-transitory computer-readable media of claim 11, wherein the media element comprises a series of coordinates that represents a freeform drawing, and further comprising instructions, which when executed by one or more processors cause the one or more processors to perform an operation comprising displaying, based on the series of coordinates, a freeform drawing on the second graphical map.

16. The one or more non-transitory computer-readable media of claim 11, further comprising instructions, which when executed by one or more processors cause the one or more processors to perform operations comprising:
  displaying a message history on the second mobile device comprising a plurality of message entries that includes a first message entry associated with the pin; and
  in response to a user interaction with the first message entry, causing to be displayed on the second graphical map the pin.

17. The one or more non-transitory computer-readable media of claim 16, wherein the plurality of message entries further comprises a second message entry, wherein the second message entry is associated with a text message.

18. The one or more non-transitory computer-readable media of claim 11, wherein the enriched pin data represents a route of travel between a current position of the first mobile device and the point.

19. The one or more non-transitory computer-readable media of claim 18, further comprising instructions, which when executed by one or more processors cause the one or more processors to perform an operation comprising displaying, on the second graphical map, a route of travel between the current position of the first mobile device and the point.

20. The one or more non-transitory computer-readable media of claim 18, further comprising instructions, which when executed by one or more processors cause the one or more processors to perform operations comprising:
  determining, by the second mobile device, an estimated time of arrival of the first mobile device at the point; and
  displaying the estimated time of arrival on the second graphical map.

* * * * *